US012010136B2

(12) United States Patent
Adams

(10) Patent No.: US 12,010,136 B2
(45) Date of Patent: Jun. 11, 2024

(54) DYNAMIC MESSAGE ANALYSIS PLATFORM FOR ENHANCED ENTERPRISE SECURITY

(71) Applicant: Proofpoint, Inc., Sunnyvale, CA (US)

(72) Inventor: J Trent Adams, Highlands Ranch, CO (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 18/213,323

(22) Filed: Jun. 23, 2023

(65) Prior Publication Data

US 2023/0353591 A1 Nov. 2, 2023

Related U.S. Application Data

(63) Continuation of application No. 17/016,819, filed on Sep. 10, 2020, now Pat. No. 11,729,200.

(60) Provisional application No. 62/947,050, filed on Dec. 12, 2019.

(51) Int. Cl.
*H04L 9/40* (2022.01)

(52) U.S. Cl.
CPC ........ *H04L 63/1433* (2013.01); *H04L 63/123* (2013.01); *H04L 63/1425* (2013.01)

(58) Field of Classification Search
CPC .............. H04L 63/1433; H04L 63/123; H04L 63/1425; H04L 51/212; H04L 63/0236; H04L 63/0263; H04L 63/1483; H04L 63/205; H04W 4/12; G06Q 10/107

See application file for complete search history.

(56) References Cited

U.S. PATENT DOCUMENTS

| | | | | |
|---|---|---|---|---|
| 9,294,497 B1* | 3/2016 | Ben-Or | ............... | H04L 63/1433 |
| 9,635,049 B1 | 4/2017 | Oprea et al. | | |
| 10,154,056 B2* | 12/2018 | Kennedy | ............. | H04L 63/1466 |
| 11,063,897 B2* | 7/2021 | Kessler | ................ | G06Q 10/107 |
| 11,178,168 B1* | 11/2021 | Lin | ...................... | H04L 63/1433 |
| 11,411,990 B2* | 8/2022 | Pandey | ............... | H04L 63/1466 |
| 2005/0204009 A1* | 9/2005 | Hazarika | ............. | G06Q 10/107 |
| | | | | 709/206 |

(Continued)

OTHER PUBLICATIONS

Feng, Yu, et al. "Automated synthesis of semantic malware signatures using maximum satisfiability." arXiv preprint arXiv: 1608.06254 (2016). (Year: 2016).*

(Continued)

*Primary Examiner* — Theodore C Parsons
*Assistant Examiner* — Sameera Wickramasuriya
(74) *Attorney, Agent, or Firm* — Banner & Witcoff, Ltd.

(57) ABSTRACT

Aspects of the disclosure relate to dynamic message analysis using machine learning. Using one or more automated methods, a computing platform may identify relationships between message sender domains and message recipient domains. After identifying the relationships, the computing platform may apply a security scoring process to a message sender domain to compute a weighted security score for the message sender domain. The computing platform may determine a weighted grade for the message sender domain based on the weighted security score for the message sender domain. Based on the weighted grade for the message sender domain, the computing platform may execute one or more enhanced protection actions associated with the message sender domain.

20 Claims, 15 Drawing Sheets

(56) References Cited

U.S. PATENT DOCUMENTS

| | | | |
|---|---|---|---|
| 2006/0168024 A1* | 7/2006 | Mehr | H04L 63/14 709/206 |
| 2009/0122704 A1 | 5/2009 | DeVal et al. | |
| 2009/0216842 A1* | 8/2009 | Risher | G06Q 10/107 709/206 |
| 2010/0192224 A1 | 7/2010 | Ferri et al. | |
| 2012/0174219 A1 | 7/2012 | Hernandez et al. | |
| 2016/0094566 A1* | 3/2016 | Parekh | H04L 63/145 726/1 |
| 2018/0152471 A1* | 5/2018 | Jakobsson | H04L 63/1425 |
| 2019/0312729 A1* | 10/2019 | Sachtjen | H04L 51/04 |
| 2021/0185075 A1 | 6/2021 | Adams | |

OTHER PUBLICATIONS

Arora, Anshul, and Sateesh K. Peddoju. "Minimizing network traffic features for android mobile malware detection." Proceedings of the 18th international conference on distributed computing and networking. 2017. (Year: 2017).*
May 6, 2021 (EP) Extended European Search Report—App. 20213921.8.
May 7, 2021 (EP) Extended European Search Report—App. 20213922.6.
May 10, 2021 (EP) Extended European Search Report—App. 20213925.
Aug. 2, 2022—U.S. Non-Final Office Action—U.S. Appl. No. 17/016,980.
Mar. 6, 2023—U.S. Notice of Allowance—U.S. Appl. No. 17/016,980.
Mar. 23, 2023—U.S. Notice of Allowance—U.S. Appl. No. 17/016,819.
Alsubhi et al., "Alert Prioritization in Intrusion Detection Systems", NOMS 2008—2008 IEEE Network Operations and Management Symposium. IEEE, 2008 (Year: 2008).
Antonakakis, et al. "Detecting Malware Domains at the Upper DNS Hierarchy" USENIX Security Symposium, vol. 11.2011. (Year: 2011).
Apr. 11, 2023—(EP) Office Action—App 20213921.8.
Apr. 11, 2023—(EP) Office Action—App 20213922.6.
Apr. 13, 2023—U.S. Final Office Action—U.S. Appl. No. 17/016,980.
Apr. 12, 2023—(EP) Office Action—App 20213925.9.
Rsa: "How the Libraesva URLSand sandboxing service works", Sep. 15, 2016, pp. 1-9, XP093036672, Retrieved from the Internet: URL:https://docs.libraesva.com/knowledgebase/how-the-esva-uri-sandboxing-service-works/ [retrieved on Mar. 31, 2023].
Feb. 16, 2024—(U.S.) Final Office Action—U.S. Appl. No. 17/199,964.

* cited by examiner

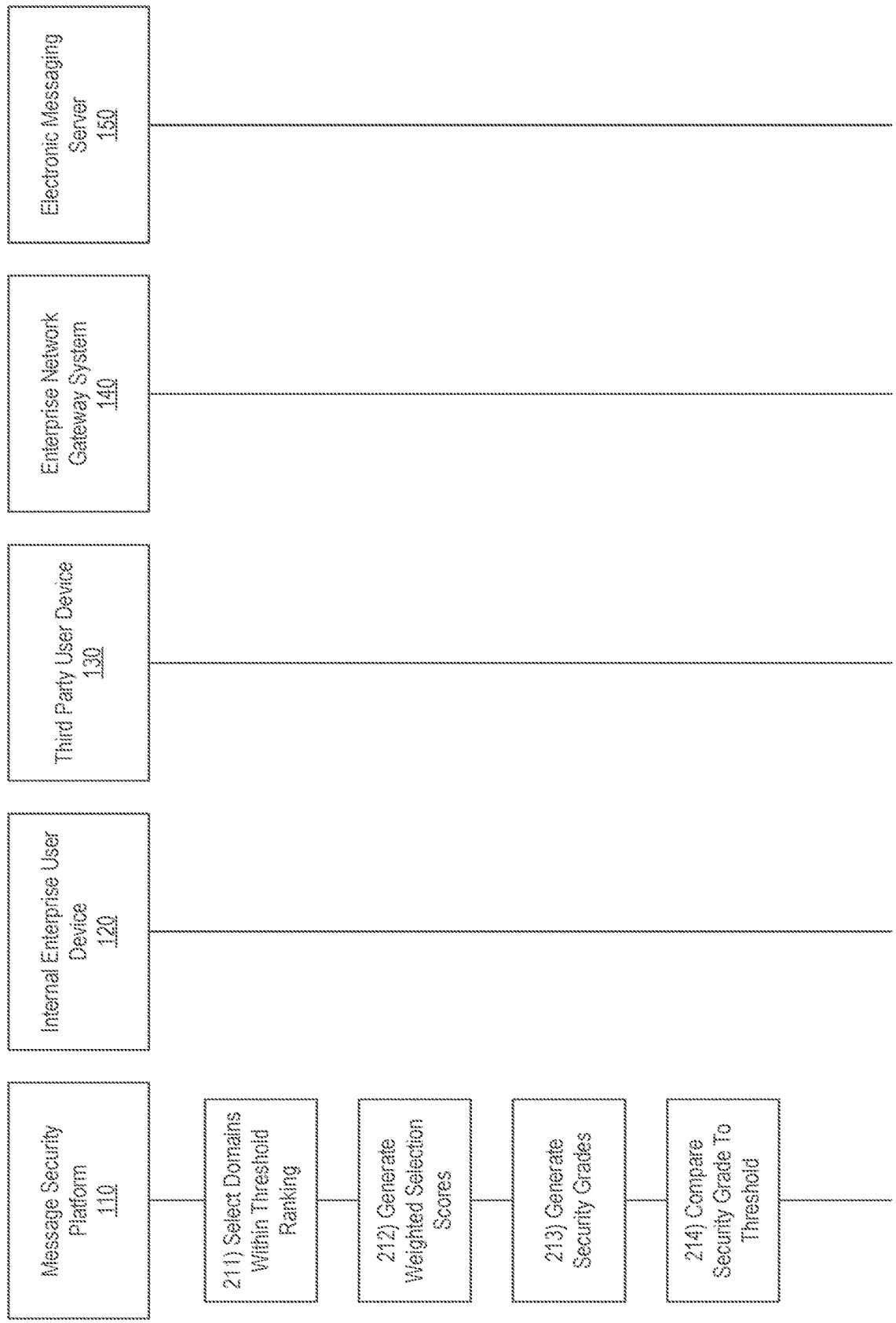

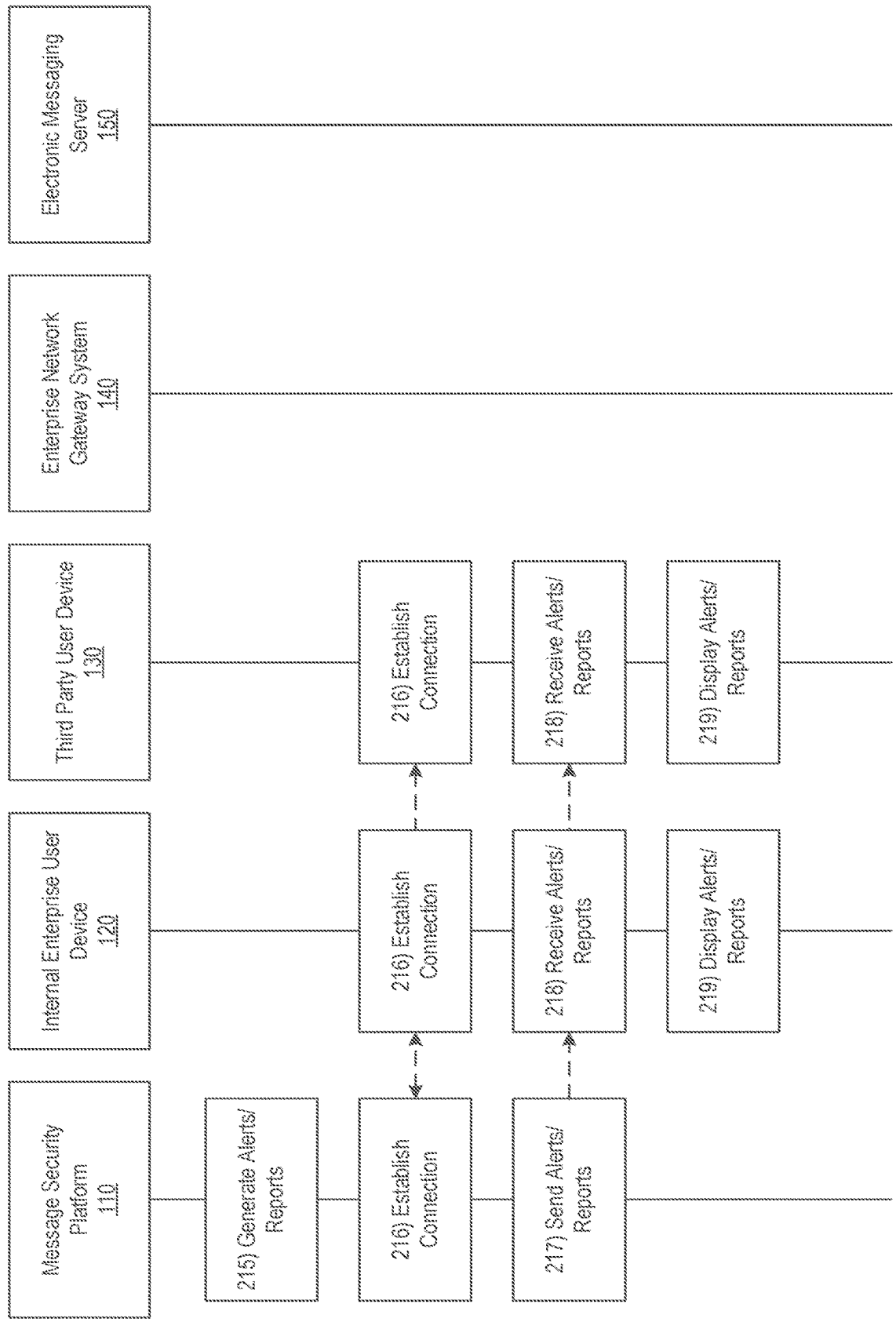

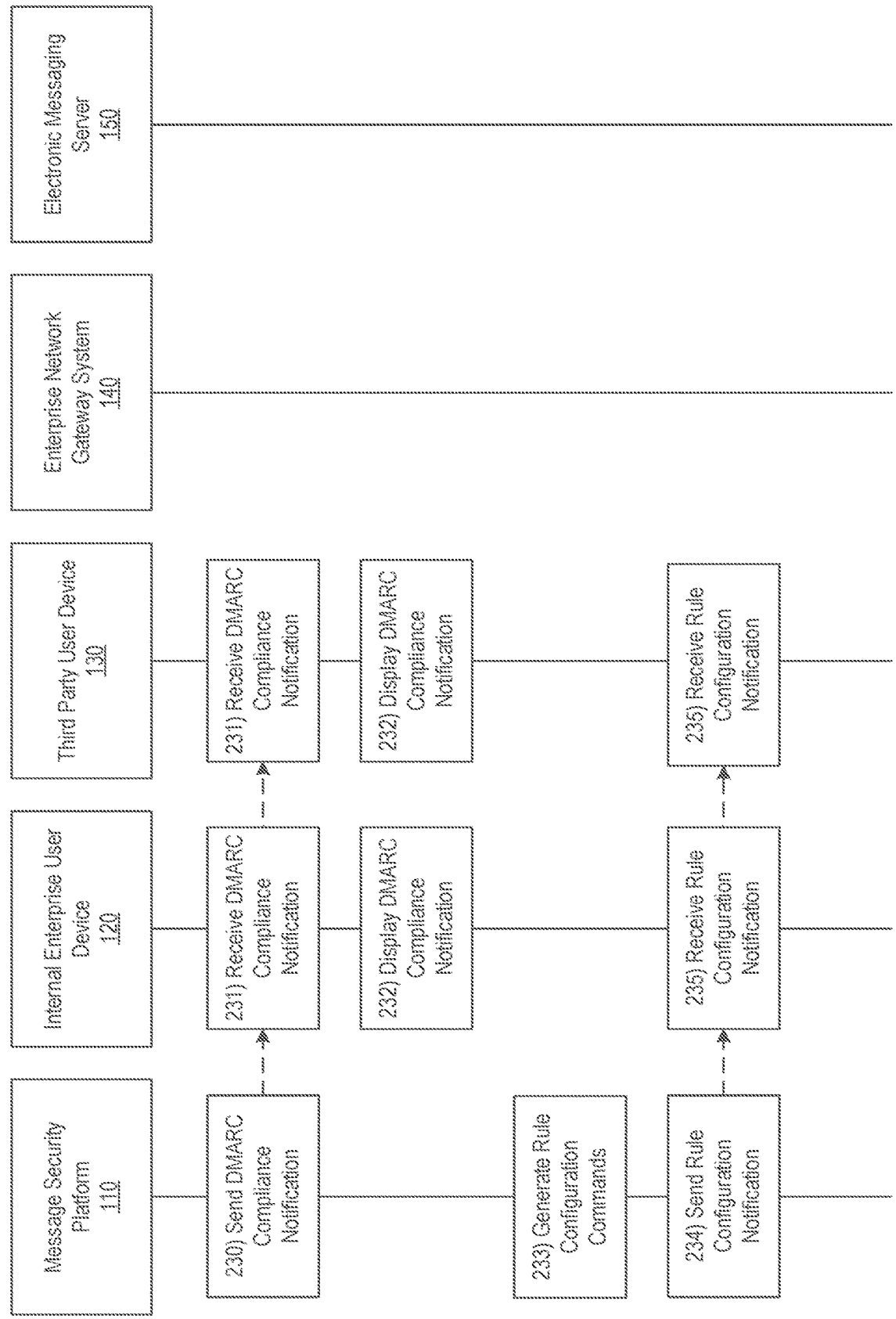

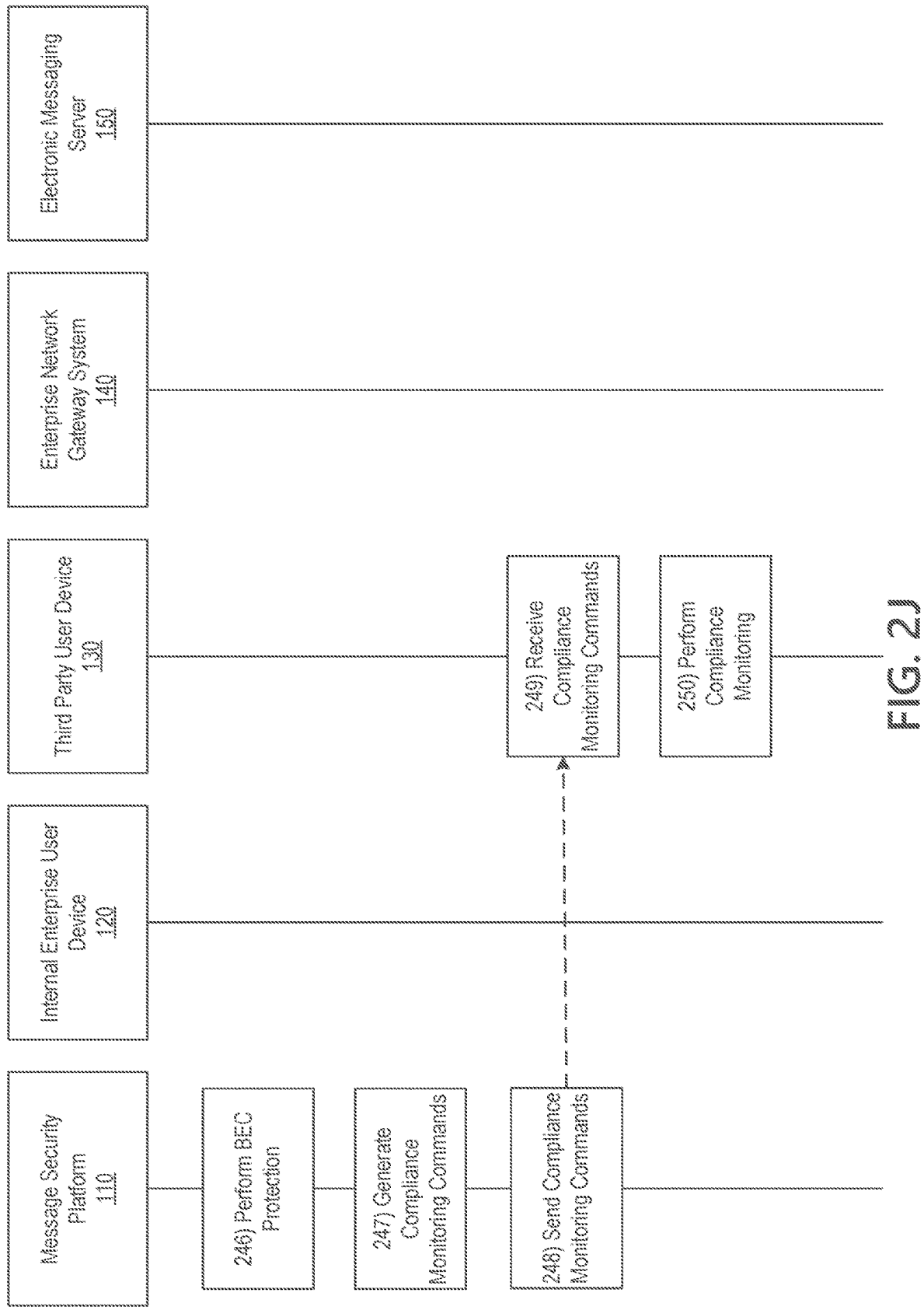

DYNAMIC MESSAGE ANALYSIS PLATFORM FOR ENHANCED ENTERPRISE SECURITY

CROSS-REFERENCE TO RELATED APPLICATIONS

This application is a continuation of and claims priority to co-pending U.S. application Ser. No. 17/016,819 filed Sep. 10, 2020, and entitled, "Dynamic Message Analysis Platform for Enhanced Enterprise Security," which claims the benefit of and priority to U.S. Provisional Patent Application Ser. No. 62/947,050, filed Dec. 12, 2019, and entitled "Supply Chain Email Security," all of which are incorporated by reference herein in their entirety.

TECHNICAL FIELD

Aspects of the disclosure relate to message processing and management systems, data processing methods, machine learning systems, and communication systems and networks. In particular, one or more aspects of the disclosure relate to identifying compromised domains within a supply chain network and executing enhanced protection actions accordingly.

BACKGROUND

Increasingly, organizations face various cybersecurity threats through electronic communications. Various methods of message analysis have been developed to combat these threats. When analyzing messages and their contents, however, it remains difficult to identify compromised domains, impersonated domains, and/or other similar domain-based threats that may be included in and/or otherwise associated with such messages. Additionally, because risks posed by compromised or impersonated domains may arise with regard to both communications both within an enterprise organization (referred to herein as internal communications) and between the enterprise organization and third parties (referred to herein as external communications), attempts to integrate domain analysis techniques into efficient and effective monitoring processes present various technical challenges, particularly when trying to balance enterprise network security against the optimal consumption of computing resources, such as processing power and network bandwidth.

SUMMARY

Aspects of the disclosure provide technical solutions that overcome one or more of the technical problems described above and/or other technical challenges. For instance, one or more aspects of the disclosure relate to enhancing enterprise security through dynamic message analysis, which may include identifying relationships between internal and external domains, applying a security scoring process to the external domains, and executing enhanced protection actions with regard to a subset of the external domains as identified in the security scoring process.

In accordance with one or more embodiments, a computing platform having at least one processor, a communication interface, and memory may identify, using one or more automated methods, one or more relationships between a plurality of message sender domains and a plurality of message recipient domains. After identifying the one or more relationships between the plurality of message sender domains and the plurality of message recipient domains, the computing platform may apply a security scoring process to a message sender domain of the plurality of message sender domains to compute a weighted security score for the message sender domain of the plurality of message sender domains. The computing platform may determine a weighted grade for the message sender domain of the plurality of message sender domains based on the weighted security score for the message sender domain of the plurality of message sender domains. Based on the weighted grade for the message sender domain of the plurality of message sender domains, the computing platform may execute one or more enhanced protection actions associated with the message sender domain of the plurality of message sender domains.

In one or more embodiments, the computing platform may identify the one or more relationships between the plurality of message sender domains and the plurality of message recipient domains by using one or more manual methods to identify the one or more relationships between the plurality of message sender domains and the plurality of message recipient domains. In one or more embodiments, the computing platform may use the one or more manual methods to identify the one or more relationships between the plurality of message sender domains and the plurality of message recipient domains by: 1) sending, to an internal enterprise user device, a request to export relationship data associated with the one or more relationships between the plurality of message sender domains and the plurality of message recipient domains; and 2) receiving, from the internal enterprise user device, information identifying the one or more relationships between the plurality of message sender domains and the plurality of message recipient domains.

In one or more embodiments, the computing platform may receive the information identifying the one or more relationships between the plurality of message sender domains and the plurality of message recipient domains by receiving one or more enterprise resource planning (ERP) export files or one or more curated lists. In one or more embodiments, the computing platform may use the one or more automated methods to identify the one or more relationships between the plurality of message sender domains and the plurality of message recipient domains by: 1) identifying, based on messages at an electronic messaging server, domains associated with bi-directional messaging traffic; 2) selecting, from the domains associated with the bi-directional messaging traffic, a plurality of external domains for a conversation detection process; 3) computing an initial set of rank-ordered external domains based on the plurality of external domains; and 4) removing, from the initial set of rank-ordered external domains, a set of one or more known outlier domains, resulting in a final set of rank-ordered external domains, where the final set of rank-ordered external domains corresponds to the plurality of message sender domains.

In one or more embodiments, the computing platform may compute the initial set of rank-ordered external domains by: for each external domain of the plurality of external domains selected for the conversation detection process: 1) identifying a first number of messages sent from one or more enterprise domains to the external domain; 2) identifying a second number of messages received at the one or more enterprise domains from the external domain; 3) computing a first ratio and a second ratio, where: the first ratio is the first number divided by the second number, and the second ratio is the second number divided by the first number; 4) identifying a difference between the first ratio and the second ratio; and 5) applying a weight value to the difference based on a quantity of messages corresponding to the first number and the second number, resulting in a weighted difference value for the external domain. In some instances, the computing platform may identify the first number of messages sent from the one or more enterprise domains to the external domain and the second number of messages received at the one or more enterprise domains from the external domain concurrently (e.g., at substantially the same time). The computing platform may rank the plurality of external domains selected for the conversation detection process based on each external domain's corresponding weighted difference.

In one or more embodiments, the computing platform may use the one or more automated methods to identify the one or more relationships between the plurality of message sender domains and the plurality of message recipient domains by identifying the one or more relationships between the plurality of message sender domains and the plurality of message recipient domains by one or more of: inspecting domain name system (DNS) records, applying one or more heuristics, applying machine learning algorithms, using methods for domain identification, applying natural language processing algorithms, or extrapolating based on common industry data.

In one or more embodiments, the computing platform may apply the security scoring process to the message sender domain of the plurality of message sender domains by evaluating the message sender domain based on one or more of: a security posture corresponding to the message sender domain, historical threat information corresponding to the message sender domain, trust metrics, reputation data, or external data corresponding to security of the message sender domain.

In one or more embodiments, applying the security scoring process to the message sender domain of the plurality of message sender domains may result in: one or more domain scores corresponding to the message sender domain, one or more sender scores corresponding to a specific sender of one or more messages originating from the message sender domain, or one or more message scores corresponding to a specific message originating from the message sender domain. In one or more embodiments, the computing platform may execute the one or more enhanced protection actions associated with the message sender domain of the plurality of message sender domains by: 1) comparing the weighted grade for the message sender domain of the plurality of message sender domains to a first enhanced protection threshold; 2) in response to determining that the weighted grade for the message sender domain of the plurality of message sender domains does not exceed the first enhanced protection threshold, executing one or more informative protection actions; and 3) in response to determining that the weighted grade for the message sender domain of the plurality of message sender domains exceeds the first enhanced protection threshold: a) comparing the weighted grade for the message sender domain of the plurality of message sender domains to a second enhanced protection threshold, b) in response to determining that the weighted grade for the message sender domain of the plurality of message sender domains does not exceed the second enhanced protection threshold, executing one or more active protection actions, and c) in response to determining that the weighted grade for the message sender domain of the plurality of message sender domains exceeds the second enhanced protection threshold, executing one or more automatic protection actions.

In one or more embodiments, the computing platform may execute the one or more informative protection actions by: generating one or more alerts, reports, enhanced security configurations, or guidelines corresponding to electronic messaging security; and sending, to an internal enterprise user device, the one or more alerts, reports, enhanced security configurations, or guidelines. In one or more embodiments, the computing platform may execute the one or more active protection actions by one or more of: 1) sending one or more commands to an enterprise user device directing the enterprise user device to enforce inbound email authentication verification (e.g., such as Sender Policy Framework (SPF), DomainKeys Identified Mail (DKIM), Domain-based Message Authentication, Reporting and Conformance (DMARC), or other automated and/or manually configured trust and/or reputation metrics) from the message sender domain, 2) sending one or more commands to an internal enterprise user device or an external enterprise user device directing a user to update a security configuration of an enterprise network gateway, 3) sending one or more commands to the internal enterprise user device directing the internal enterprise user device to configure messages from the message sender domain to include a warning message, or 4) sending one or more commands to the internal enterprise user device or the external enterprise user device to initiate a security awareness training program.

In one or more embodiments, the computing platform may execute the one or more automatic protection actions by one or more of: sending one or more commands to an enterprise network gateway directing the enterprise network gateway to enforce inbound email authentication verification for email from the message sender domain, wherein enforcing the inbound email authentication verification for email comprises 1) enforcing one or more of: SPF, DKIM, DMARC, or 2) monitoring the enterprise network gateway to enforce the inbound email authentication verification.

In accordance with one or more additional and/or alternative embodiments, a computing platform having at least one processor, a communication interface, and memory may monitor an electronic messaging server associated with an enterprise organization. Based on monitoring the electronic messaging server associated with the enterprise organization, the computing platform may identify bi-directional messaging traffic between one or more enterprise domains associated with the enterprise organization and one or more external domains not associated with the enterprise organization. Based on identifying the bi-directional messaging traffic between the one or more enterprise domains associated with the enterprise organization and the one or more external domains not associated with the enterprise organization, the computing platform may select a plurality of external domains for a conversation detection process. The computing platform may compute an initial set of rank-ordered external domains by: 1) for each external domain of the plurality of external domains selected for the conversation detection process: a) identifying a first number of messages sent from an enterprise domain of the one or more enterprise domains to the external domain; b) identifying a second number of messages received at the one or more enterprise domains from the external domain; c) computing a first ratio and a second ratio, where: the first ratio is the first number divided by the second number, and the second ratio is the second number divided by the first number; d) identifying a difference between the first ratio and the second ratio; and e) applying a weight value to the difference based on a quantity of messages corresponding to the first number and the second number, resulting in a weighted difference value for the external domain; and 2) ranking the plurality of external domains selected for the conversation detection process based on each external domain's corresponding weighted difference value. In some instances, the computing platform may identify the first number of messages sent from the one or more enterprise domains to the external domain and the second number of messages received at the one or more enterprise domains from the external domain concurrently (e.g., at substantially the same time). The computing platform may remove, from the initial set of rank-ordered external domains, a set of one or more known outlier domains, resulting in a final set of rank-ordered external domains. The computing platform may execute one or more enhanced protection actions associated with at least one external domain of the final set of rank-ordered external domains.

In one or more embodiments, the computing platform may send, to an internal enterprise user device, a request for one or more manually identified domains for a security scoring process. The computing platform may receive, from the internal enterprise user device, one or more ERP export files or one or more curated lists that specify the one or more manually identified domains, which may include executing at least one enhanced protection action on at least one of the one or more manually identified domains.

In one or more embodiments, the computing platform may apply one or more additional automated methods to identify one or more automatically identified domains. In addition, the one or more additional automated methods may include one or more of: inspecting DNS records, applying one or more heuristics, applying machine learning algorithms, using methods for domain identification, applying natural language processing algorithms, or extrapolating based on common industry data. Additionally, the one or more enhanced protection actions may be further associated with at least one of the one or more automatically identified domains.

In one or more embodiments, the computing platform may apply a security scoring process to the final set of rank-ordered external domains, including the at least one external domain, to compute a weighted security score for the at least one external domain of the final set of rank-ordered external domains. In one or more embodiments, the computing platform may apply the security scoring process to the final set of rank-ordered external domains by evaluating the at least one external domain based on one or more of: a security posture corresponding to the at least one external domain, historical threat information corresponding to the at least one external domain, trust metrics, reputation data, or external data corresponding to security of the at least one external domain.

In one or more embodiments, applying the security scoring process to the final set of rank-ordered external domains may result in: one or more domain scores corresponding to the at least one external domain, one or more sender scores corresponding to a specific sender of one or more messages originating at the at least one external domain, or one or more message scores corresponding to a specific message originating from the at least one external domain.

In one or more embodiments, the computing platform may execute the one or more enhanced protection actions associated with the at least one external domain by: 1) comparing the weighted grade to a first enhanced protection threshold; 2) in response to determining that the weighted grade does not exceed the first enhanced protection threshold, executing one or more informative protection actions; and 3) in response to determining that the weighted grade exceeds the first enhanced protection threshold: a) comparing the weighted grade to a second enhanced protection threshold, b) in response to determining that the weighted grade does not exceed the second enhanced protection threshold, executing one or more active protection actions, and c) in response to determining that the weighted grade exceeds the second enhanced protection threshold, executing one or more automatic protection actions.

In one or more embodiments, the computing platform may execute the one or more informative protection actions by: 1) generating one or more alerts, reports, enhanced security configurations, or guidelines corresponding to electronic messaging security; and 2) sending, to an internal enterprise user device, the one or more alerts, reports, enhanced security configurations, or guidelines. In one or more embodiments, the computing platform may execute the one or more active protection actions by one or more of: 1) sending one or more commands to an enterprise user device directing the enterprise user device to enforce inbound email authentication verification (e.g., such as SPF, DKIM, DMARC, and/or other automated and/or manually configured trust and/or reputation metrics) for messages from the at least one external domain, 2) sending one or more commands to an internal enterprise user device or an external enterprise user device directing a user to update a security configuration of an enterprise network gateway, 3) sending one or more commands to the internal enterprise user device directing the internal enterprise user device to configure messages from the at least one external domain to include a warning message, or 4) sending one or more commands to the internal enterprise user device or the external enterprise user device to initiate a security awareness training program. In one or more embodiments, the computing platform may execute the one or more automatic protection actions by one or more of: 1) sending one or more commands to an enterprise network gateway directing the enterprise network gateway to obey enforce inbound email authentication verification (e.g., such as SPF, DKIM, DMARC, or other automated and/or manually configured trust and/or reputation metrics) from the at least one external domain, or 2) monitoring the enterprise network gateway for DMARC compliance.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for performing dynamic message analysis and executing enhanced protection actions in accordance with one or more example embodiments;

DETAILED DESCRIPTION

Figure 1:
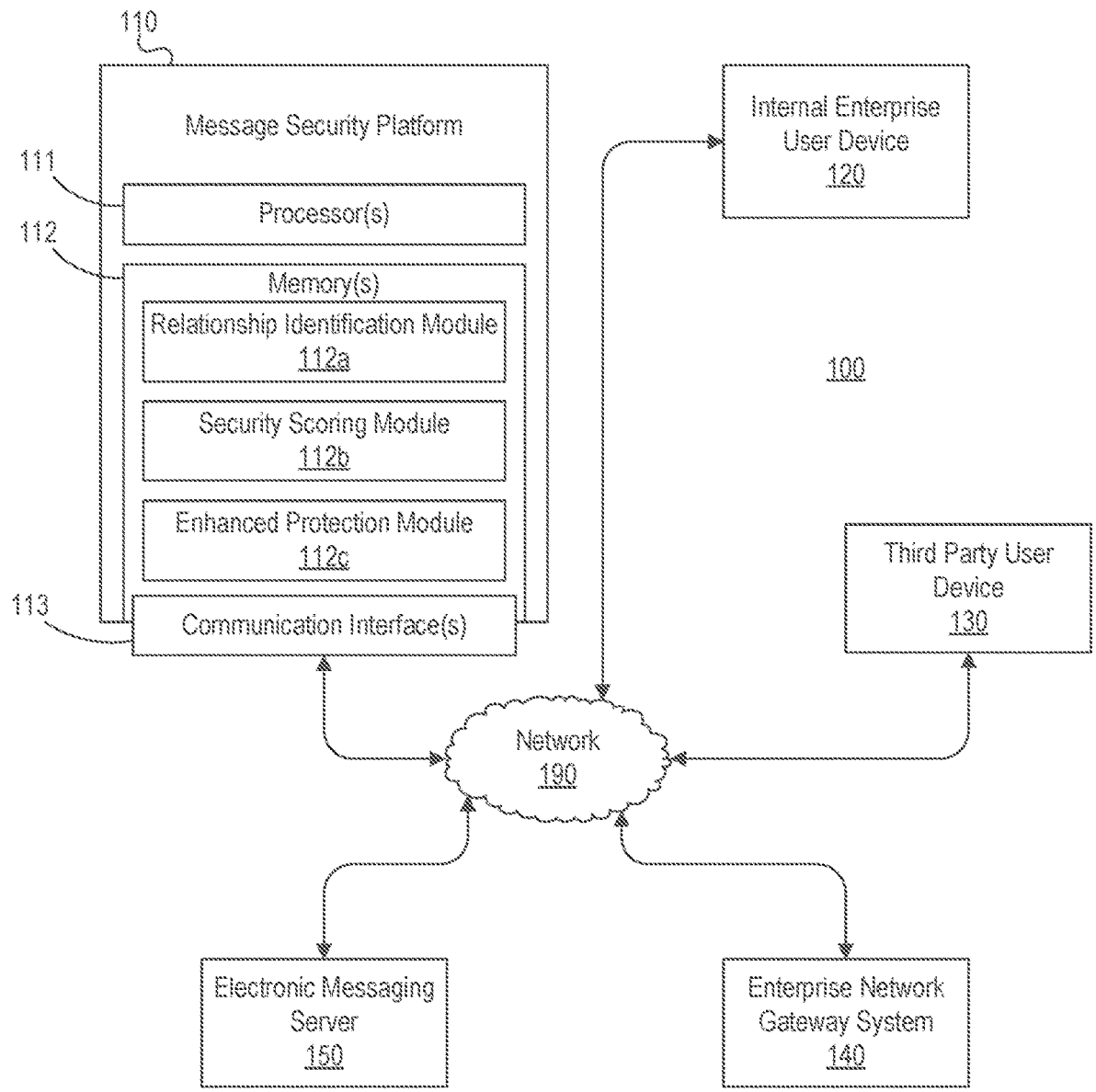
FIG. 1 depicts an illustrative operating environment for performing dynamic message analysis and executing enhanced protection actions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving enterprise security in electronic communications between an organization and its vendors and/or suppliers, trusted third party entities (which may e.g., be part of the organization's supply chain), and/or other entities. More specifically, and as discussed in further detail below, relationships between the organization's domain(s) and external domains (e.g., domains authorized to be used by external parties) may be identified and used as inputs to a security scoring process. In executing this security scoring process, one or more weighted grades may be produced for different domains, and one or more enhanced protection actions may be executed accordingly based on the weighted grades.

One or more aspects of the disclosure thus provide technical solutions to various technical problems associated with enterprise security in the context of electronic messaging. For example, it may be difficult for an enterprise organization and its users to guard against an external entity impersonating another entity that has and/or maintains a trusted relationship with the organization. By identifying relationships between internal and external domains, these domains may be more accurately and effectively scored, which may result in execution of more effective preventative and/or remedial security measures, and ultimately in enhanced enterprise security. Furthermore, by reducing an amount of domains to be analyzed through a security scoring, grading, and ranking process, processing resources and/or other computing resources may be conserved while still ensuring that the highest priority domains are evaluated.

For example, an enterprise organization may have robust message inspection policies, but members of the enterprise organization's supply chain or other third party vendors might not have such robust practices, and accordingly, malicious messages may penetrate the enterprise organization as a result of these third parties. For instance, malicious actors may attack individuals within a supply chain who might not have adequate security measures, and then may use these breached accounts to attack other and/or larger organizations (e.g., through impersonation of the third party). In these situations, one or more aspects of the disclosure may provide various benefits by implementing an additional level of protection against such attacks.

Because of limits on actual and/or available processing power, network bandwidth, and/or other computing resources, however, it may be difficult to add additional protection to all messages received by all users of an enterprise organization. Instead, and as illustrated in connection with one or more embodiments described in greater detail below, a subset of external and/or sender domains which may require heightened scrutiny and/or stronger protective measures may be identified, and enhanced protection measures may be implemented with regard to these domains accordingly. In doing so, network security and information security may be preserved and ensured while conserving processing resources and/or other computing resources. Furthermore, by reducing the scope of messages to discreet subsets, effective machine learning techniques may be trained for each of the reduced sets of communication flows.

FIG. 1 depicts an illustrative operating environment for performing dynamic message analysis and executing enhanced protection actions in accordance with one or more example embodiments. Referring to FIG. 1, computing environment 100 may include various computer systems, computing devices, networks, and/or other operating infrastructure. For example, computing environment 100 may include a message security platform 110, an internal enterprise user device 120, a third party user device 130, an enterprise network gateway system 140, an electronic messaging server 150, and a network 190.

Network 190 may include one or more wired networks and/or one or more wireless networks that interconnect message security platform 110, internal enterprise user device 120, third party user device 130, enterprise network gateway system 140, electronic messaging server 150, and/or other computer systems and/or devices. In addition, each of message security platform 110, internal enterprise user device 120, third party user device 130, enterprise network gateway system 140, and electronic messaging server 150 may be special purpose computing devices configured to perform specific functions, as illustrated in greater detail below, and may include specific computing components such as processors, memories, communication interfaces, and/or the like.

Message security platform 110 may include one or more processor(s) 111, one or more memory(s) 112, and one or more communication interface(s) 113. In some instances, message security platform 110 may be made up of a plurality of different computing devices, which may be distributed within a single data center or a plurality of different data centers. In these instances, the one or more processor(s) 111, one or more memory(s) 112, and one or more communication interface(s) 113 included in message security platform 110 may be part of and/or otherwise associated with the different computing devices that form message security platform 110.

In one or more arrangements, processor(s) 111 may control operations of message security platform 110. Memory(s) 112 may store instructions that, when executed by processor(s) 111, cause message security platform 110 to perform one or more functions, as discussed below. Communication interface(s) 113 may include one or more wired and/or wireless network interfaces, and communication interface(s) 113 may connect message security platform 110 to one or more networks (e.g., network 190) and/or enable message security platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message security platform 110 to perform various functions) and/or databases (which may, e.g., store data used by message security platform 110 in performing various functions). For example, memory(s) 112 may store and/or otherwise provide relationship identification module 112a, security scoring module 112b, and enhanced protection module 112c. In some instances, relationship identification module 112a may store instructions that cause message security platform 110 to apply one or more manual relationship identification processes (e.g., ERP export, curated lists, and/or other processes), one or more automated relationship identification processes (e.g., heuristics, algorithmic, machine learning, and/or other processes), and/or one or more other functions described herein. Additionally, security scoring module 112b may store data that may be used by message security platform 110 in applying a security scoring process to the identified relationships, computing weighted grades for external domains, and/or in executing one or more other functions described herein. Furthermore, enhanced protection module 112c may store instructions and/or data that may cause and/or be used by message security platform 110 to perform one or more enhanced protection actions (e.g., informative protection actions, active protection actions, automated protection actions, and/or other actions, which may include sending alerts to users, administrators, and/or security information and event management (SIEM) interfaces) and/or execute one or more other functions described herein.

Internal enterprise user device 120 may be configured to be used by a first user (who may, e.g., be an employee of an enterprise organization). In some instances, internal enterprise user device 120 may be configured to present one or more user interfaces associated with security alerts, reports, enhanced security configurations, guidelines, and/or other content.

Third party user device 130 may be configured to be used by a second user (who may, e.g., be an employee of a third party organization, which may be a vendor to the enterprise organization and/or otherwise be included in a supply chain for the enterprise organization). For example, third party user device 130 may be used by and/or linked to a trusted business partner, vendor, customer, or other entity having a long-term relationship with the enterprise organization. In some instances, third party user device 130 may be configured to present one or more user interfaces associated with security alerts, reports, enhanced security configurations, guidelines, and/or other content.

Enterprise network gateway system 140 may be and/or include one or more computing devices (e.g., servers, server blades, enterprise devices, or the like) that may be configured to enforce and/or otherwise maintain network security policies (e.g., DMARC compliance policies, business email compromise (BEC) protection policies, email account compromise (EAC) policies, and/or other policies) for the enterprise organization. In some instances, the enterprise network gateway system 140 may be configured to receive commands from the message security platform 110 and to update network security policies in response to or based on the commands.

Electronic messaging server 150 may be and/or include one or more computing devices (e.g., servers, server blades, enterprise devices, or the like) that may be configured to host one or more electronic messaging services (e.g., email services). Furthermore, the electronic messaging server 150 may be configured to provide messages for analysis at the message security platform 110.

Figure 2A:
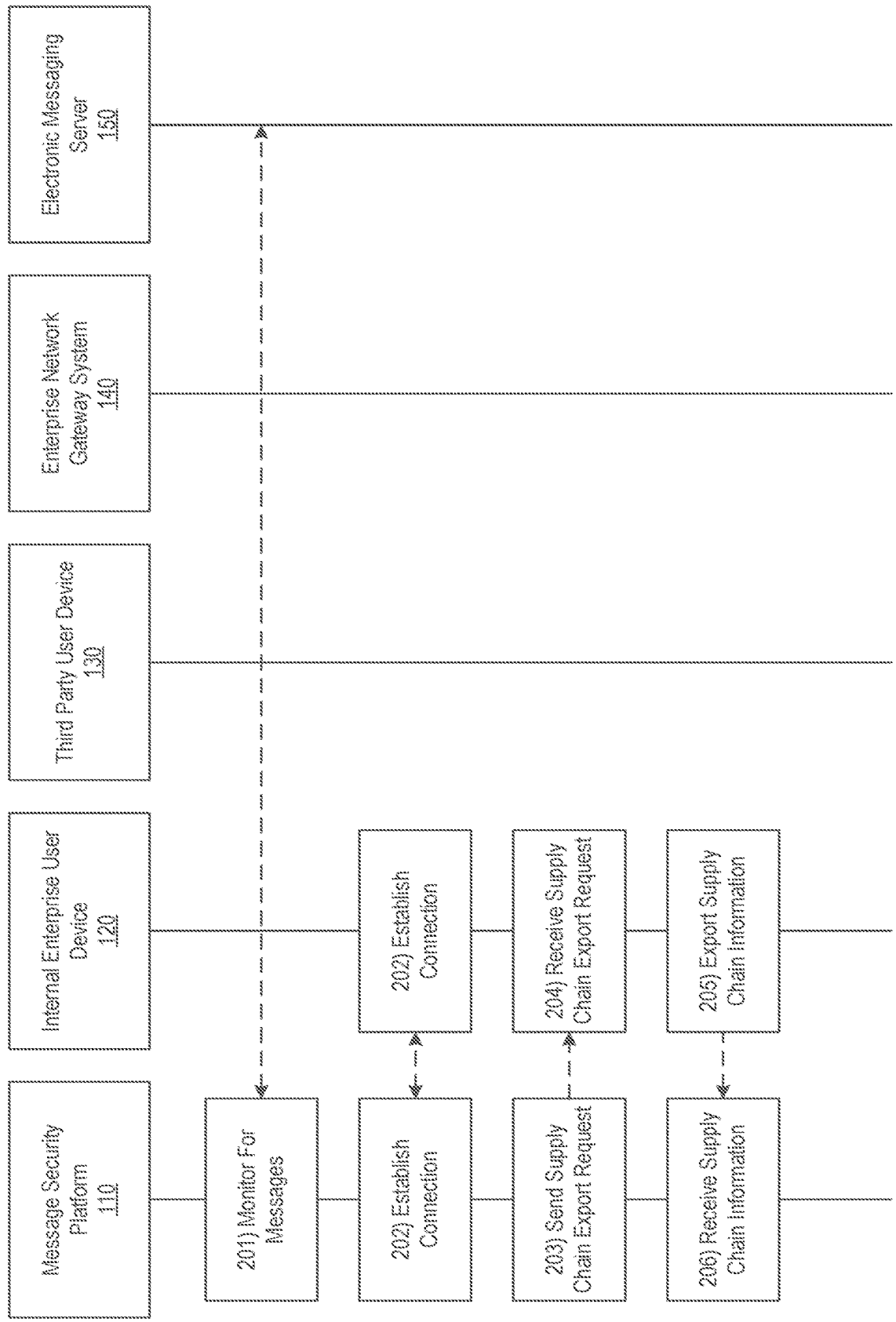

FIGS. 2A-2J depict an illustrative event sequence for performing dynamic message analysis and executing enhanced protection actions in accordance with one or more example embodiments. Referring to FIG. 2A, at step 201, message security platform 110 may monitor the electronic messaging server 150 for messages (e.g., new email messages). For example, the message security platform 110 may monitor the electronic messaging server 150 continuously or at a predetermined interval to collect messages between a plurality of message recipient domains and a plurality of message sender domains, which may in some instances correspond to internal domains (e.g., domains that are maintained by and/or otherwise associated with the enterprise organization) and external domains (e.g., domains that are maintained by and/or otherwise associated with an organization different from the enterprise organization), respectively.

Once messages have been received at the message security platform 110, the message security platform may initiate a manual and/or automated process to identify relationships between message senders and recipients (e.g., as described below with regard to steps 202-210).

For example, with regard to the manual identification process, at step 202, the message security platform 110 may establish a connection with internal enterprise user device 120. For example, the message security platform 110 may establish a first data connection with internal enterprise user device 120 to link the message security platform 110 to the internal enterprise user device 120 (e.g., in preparation for requesting supply chain information). In some instances, the message security platform 110 may identify whether or not a connection is already established with the internal enterprise user device 120. If a connection is already established with the internal enterprise user device 120, the message security platform 110 might not re-establish the connection. If a connection is not yet established with the internal enterprise user device 120, the message security platform 110 may establish the first data connection as described herein.

At step 203, the message security platform 110 may generate and send, share, or otherwise provide a request to the internal enterprise user device 120 for supply chain information. For example, in generating and/or sending such a request, the message security platform 110 may generate and send a request to export relationship data associated with one or more relationships between the plurality of message sender domains and the plurality of message recipient domains (which may, e.g., be indicative of vendors and/or other companies in an organization's supply chain). In some instances, the message security platform 110 may send the request for supply chain information to the internal enterprise user device 120 via the communication interface 113 and while the first data connection is established.

At step 204, the internal enterprise user device 120 may receive or otherwise access the request for supply chain information sent at step 203. For example, the internal enterprise user device 120 may receive the request for supply chain information while the first data connection is established.

At step 205, the internal enterprise user device 120 may identify and send, share, or otherwise provide supply chain information to the message security platform 110. In some instances, in sending the supply chain information to the message security platform 110, the internal enterprise user device 120 may send information identifying the one or more relationships between the plurality of message sender domains and the plurality of message recipient domains. In some instances, in sending the supply chain information to the message security platform 110, the internal enterprise user device 120 may send one or more enterprise resource planning (ERP) export files, one or more curated lists, or the like, which may, in some instances, be based on user input received at the internal enterprise user device 120 from a user of the internal enterprise user device 120 (who may, e.g., be referred to as a first user). Additionally or alternatively, the internal enterprise user device 120 may present one or more graphical user interfaces that may enable a user to search for and/or select an organization by name and identify all known sending domains corresponding to the organization (which may, in some instances, include receiving input classifying a relationship type). In these instances, in sending the supply chain information, the internal enterprise user device 120 may send information received via the one or more graphical user interfaces. In some instances, the internal enterprise user device 120 may send the supply chain information to the message security platform 110 while the first data connection is established.

At step 206, the message security platform 110 may receive or otherwise access the supply chain information sent at step 205. In some instances, the message security platform 110 may receive the supply chain information via the communication interface 113 and while the first data connection is established.

Figure 2B:
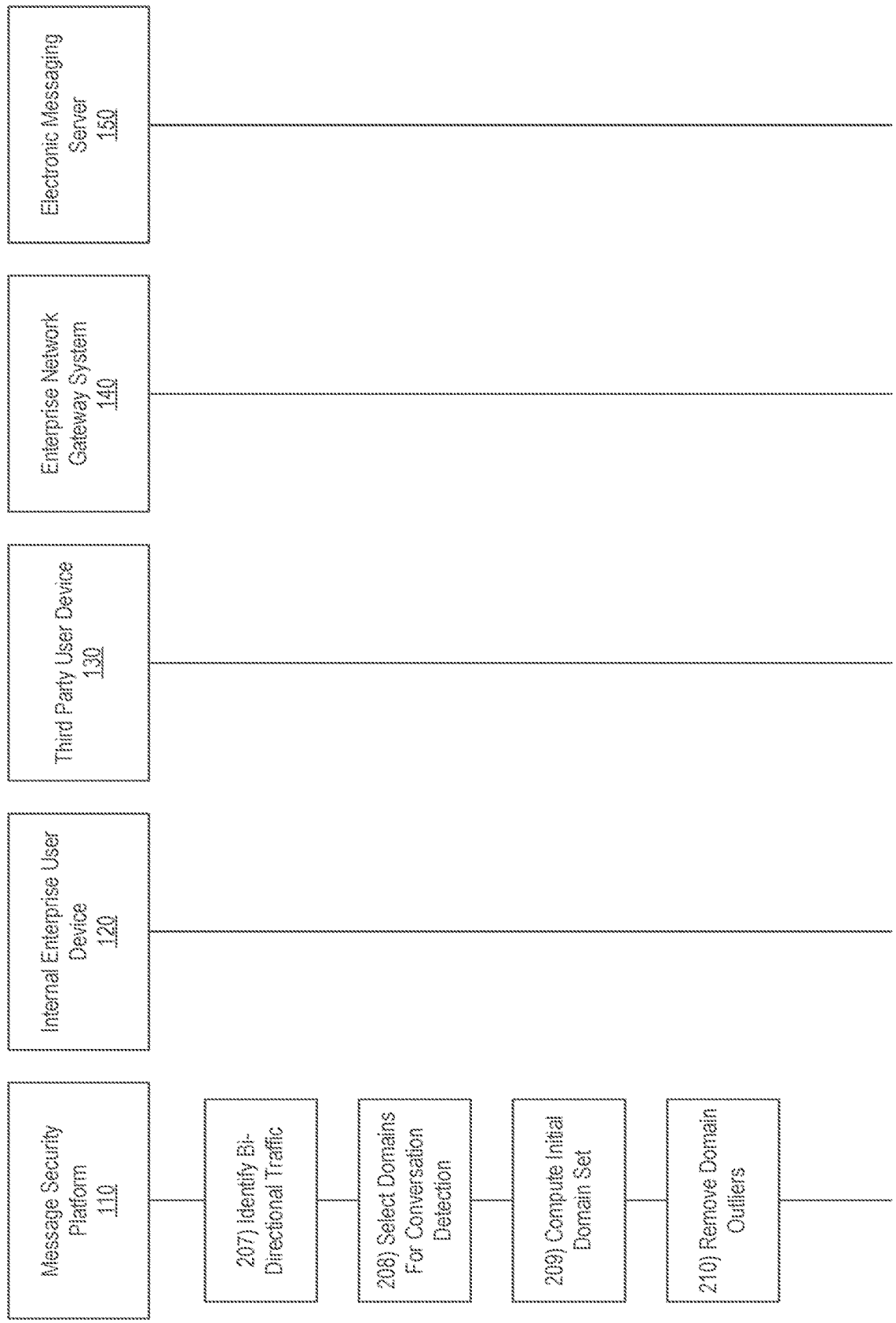

Referring to FIG. 2B, in some instances, in addition or as an alternative to the manual relationship identification process described above at steps 202-206, the message security platform 110 may identify relationships between the plurality of message senders and the plurality of message recipients using one or more automated methods. For example, at step 207, the message security platform 110 may identify, based on the messages at the electronic messaging server 150, domains associated with bi-directional message traffic (e.g., domain pairs where each domain of the pair both sends messages to and receives messages from the other, which may, in some instances, include an internal domain and an external domain).

At step 208, the message security platform 110 may select, from the domains identified at step 207, a plurality of external domains (e.g., message sender domains) for a conversation detection process. For example, the message security platform 110 may select the external domains associated with the bi-directional message traffic identified at step 207 for a conversation detection process.

At step 209, the message security platform 110 may compute an initial set of rank-ordered external domains based on the external domains selected at step 208. For example, for each external domain selected at step 208, the message security platform 110 may identify a first number of messages sent from one or more (internal) enterprise domains to the external domain and a second number of messages received at the one or more enterprise domains from the external domain. In some instances, the computing platform may identify the first number of messages sent from the one or more enterprise domains to the external domain and the second number of messages received at the one or more enterprise domains from the external domain concurrently (e.g., at substantially the same time). After identifying the first number of messages and the second number of messages, the message security platform 110 may compute a first ratio of the first number of messages divided by the second number of messages and a second ratio of the second number of messages divided by the first number of messages. After computing the first ratio and the second ratio, the message security platform 110 may identify a difference between the first ratio and the second ratio, and may apply a weight value to the difference based on a quantity of messages corresponding to the first number of messages and the second number of messages, which may result in a weighted difference value for the external domain (e.g., if the first number of messages and the second number of messages exceed a predetermined threshold, the external domain may correspond to a member of the supply chain that is frequently contacted or otherwise dealt with, and thus the difference value may be weighted higher than if the first number of messages and the second number of messages do not exceed the predetermined threshold). After completing this weighted difference value computation for each of the external domains selected at step 208, the message security platform 110 may rank the external domains selected for the conversation detection process based on their corresponding weighted difference values.

Accordingly, in computing the initial set of rank-ordered external domains, the message security platform 110 may apply the function $$f_d(a, b) = \frac{\left(\frac{a}{b}\right) - \left(\frac{b}{a}\right)}{f_v},$$

where a is the count of email sent by a customer to a specific domain, b is the count of email the customer received from the specific domain, and $f_v$ is a weighting value based on volume and risk (e.g., $f_v(a, b)=ab^2$). Without a weighted process, the message security platform 110 may generate highly balanced ratios for various external domains, which may inadvertently overvalue small conversations. For example, ratios for external domains sending five messages a month may be the same as ratios for external domains sending a million messages a month. Accordingly, the message security platform 110 may address this problem by weighting the ratios based on volume of messages exchanged.

At step 210, the message security platform 110 may remove, from the initial set of rank-ordered external domains, a set of one or more known outlier domains, which may result in a final set of rank-ordered external domains. For example, the message security platform 110 may output a set $S_2$ of rank-ordered domains, where $S_2=S_1-K$, and where K is a set of known outliers that includes domains known (e.g., to a high degree of confidence) not to be trusted suppliers (e.g., consumer mailbox providers, or the like).

In addition or as an alternative to the automated algorithmic identification process described above at steps 207-210, the message security platform 110 may identify relationships between domains using one or more heuristics (which may, e.g., apply various rules to domains and/or emails sent or received between different domains, such as a rule applying to messages sent only between 9 AM and 5 PM, or the like). Additionally or alternatively, the message security platform 110 may identify relationships through inspection of domain name system (DNS) records (e.g., dereferencing internet protocol (IP) addresses declared within Sender Policy Framework (SPF) records, Mail Exchange (MX) record delegation, and/or authority claim tokens published within DNS). Additionally or alternatively, the message security platform 110 may identify relationships between domains using machine learning techniques (e.g., Fisher Kernels, Hidden Marvov Models (HMM), clustering/support vector machine (SVM) by customer, industry, organization, and/or other groupings), natural language processing techniques (information extraction), domain identification methods (e.g., to identify potential relationship impersonations instead of or in addition to genuine relationships between domains), inference based on common industry data (e.g., domains that operate within the same industry may share similar suppliers), or the like. In some instances, these automated identification processes may provide additional value by detecting shadow information technology (IT)

services. For example, organizations might not always know whom they are doing business with (e.g., they could be using free services, expensing charges to corporate credit cards). In some instances, for previously identified domains, the message security platform 110 may roll up sub-domains, company names, or the like (e.g., using a domain database). In some instances, the actions described at step 210 may occur prior to the bi-directional weighting process described above at step 209, and this alternative arrangement may provide technical advantages in the form of reduced usage of computational resources.

Referring to FIG. 2C, at step 211, the message security platform 110 may select domains from the final set of rank ordered domains, computed at step 210, within a threshold ranking value. For example, the message security platform 110 may select the top five domains, top ten domains, or the like. In doing so, the message security platform 110 may reduce processing strain on the message security platform 110 in performing the security scoring process described below (e.g., less processing power may be needed to analyze a smaller number of domains). Furthermore, by reducing the scope of the domains to be analyzed, certain machine learning techniques may be used and/or facilitated by eliminating noise.

At step 212, the message security platform 110 may apply a security scoring process by generating weighted selection scores for the external domains selected at step 211. For example, the message security platform 110 may evaluate these external domains based on a security posture, historical threat information, trust metrics, reputation data, external data, and/or other factors. For example, the message security platform 110 may analyze publicly discovered signals corresponding to the external domains (e.g., by ensuring that a SPF configuration is compliant with the specification published by the Internet Engineering Task Force (IETF) and industry best practices, analyzing a DMARC record, and/or analyzing transport layer security (TLS) details). Additionally or alternatively, the message security platform 110 may analyze external data from other scoring entities and/or internal message level scores (which may, e.g., whether this domain has been observed being abused in another context) to identify vulnerabilities in the external domains. In doing so, the message security platform 110 may compute one or more domain scores (e.g., corresponding to the respective domains), one or more sender scores (e.g., corresponding to the respective senders of the messages), and/or one or more message scores (e.g., corresponding to specific messages originating from the respective domains) for each external domain. For example, the message security platform 110 may compute a matrix of scores that includes the one or more domain scores, one or more sender scores, and/or one or more message scores.

In some instances, the message security platform 110 may combine scores for multiple domains when a relationship between the domains has been identified (e.g., using a method such as an algorithm to identify the relationship and/or using information provided manually and/or data from external sources). Additionally or alternatively, the message security platform 110 may attribute domain scores and/or combine scores for multiple domains as belonging to and/or being operated by and/or on behalf of a specific organization such that an aggregate score may be assigned to and/or associated with that organization.

At step 213, the message security platform 110 may compute a weighted grade (e.g., a numeric grade, a letter grade, etc.) for each external domain. For example, the message security platform 110 may use the one or more domain scores, the one or more sender scores, the one or more message scores, and/or external data received from other sources as inputs into a scoring algorithm that may calculate the weighted grades for each of the external domains. In doing so, the message security platform 110 may, for instance, add the one or more domain scores, the one or more sender scores, and the one or more message scores together and apply a weighting value. In some instances, in computing the weighted grade, the message security platform 110 may effectively generate a representation of how well a third party organization corresponding to the given external domain is performing in terms of deploying their own security measures (which may, e.g., be used to inform how to proceed so as to increase protection of the enterprise organization with respect to companies in its supply chain). After determining the weighted grades for the external domains, the message security platform 110 may execute one or more enhanced protection actions (e.g., informative protection actions, active protection actions, automated protection actions, and/or other actions) based on the weighted grades, as discussed in greater detail below.

For example, at step 214, the message security platform 110 may compare the weighted grades to a first enhanced protection threshold. If the message security platform 110 determines that a weighted grade does not exceed the first enhanced protection threshold, the message security platform 110 may proceed to step 215 with regard to the corresponding external domain to perform one or more informative protection actions. If the message security platform 110 determines that a weighted grade does exceed the first enhanced protection threshold, the message security platform 110 may proceed to step 228 with regard to the corresponding external domain. In some instances, the message security platform 110 may dynamically adjust the first enhanced protection threshold over time, using one or more machine learning algorithms and/or based on a user input, so as to maintain a predetermined rate of weighted grades that exceed the first enhanced protection threshold.

Referring to FIG. 2D, at step 215, based on the determination at step 214 that a weighted grade does not exceed the first enhanced protection threshold, the message security platform 110 may generate one or more reports or alerts corresponding to the external domain. For example, the message security platform 110 may generate one or more reports or alerts that contain information identifying the external domain and an indication of a security threat.

At step 216, the message security platform 110 may establish connections with the internal enterprise user device 120 and/or the third party user device 130. For example, the message security platform 110 may establish first and/or second data connections with the internal enterprise user device 120 and/or the third party user device 130 to link the message security platform 110 to the internal enterprise user device 120 and/or the third party user device 130 (e.g., in preparation for sending one or more reports, alerts, and/or other messages). In some instances, the message security platform 110 may identify whether or not connections are already established with the internal enterprise user device 120 and/or the third party user device 130. If connections are already established with the internal enterprise user device 120 and/or the third party user device 130, the message security platform 110 might not re-establish these connections. If connections are not yet established with the internal enterprise user device 120 and/or the third party user device 130, the message security platform 110 may establish the second and third data connections as described herein.

At step 217, the message security platform 110 may send, share, or otherwise provide the reports, alerts, and/or other messages generated at step 215 to the internal enterprise user device 120 and/or the third party user device 130. For example, the message security platform 110 may send the reports, alerts, and/or other messages to the internal enterprise user device 120 and/or the third party user device 130 via the communication interface 113 and while the second and/or third wireless data connections are established.

At step 218, the internal enterprise user device 120 may receive or otherwise access the reports, alerts, and/or other messages sent at step 217. In some instances, the internal enterprise user device 120 may receive the reports, alerts, and/or other messages while the second and/or third data connections are established.

Figures 3, 4:
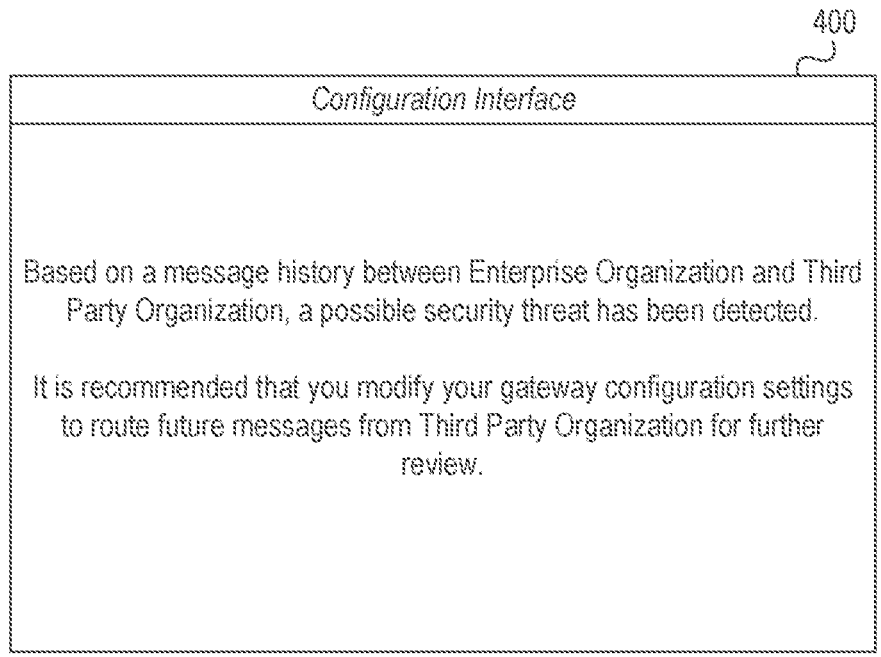
FIGS. 3-7 depict illustrative user interfaces for performing dynamic message analysis and executing enhanced protection actions in accordance with one or more example embodiments.

At step 219, the internal enterprise user device 120 and/or the third party user device 130 may display the reports, alerts, and/or other messages. For example, in displaying the reports, alerts, and/or other messages, the internal enterprise user device 120 and/or the third party user device 130 may display a graphical user interface similar to graphical user interface 300, which is shown in FIG. 3. For example, in displaying such a user interface, the internal enterprise user device 120 may display a file listing members of the organization's supply chain, corresponding weighted grades, and corresponding threats. Additionally or alternatively, in displaying such a user interface, the internal enterprise user device 120 and/or the third party user device 130 may display an indication that a possible threat has been identified related to "Third Party Organization."

Figure 2E:
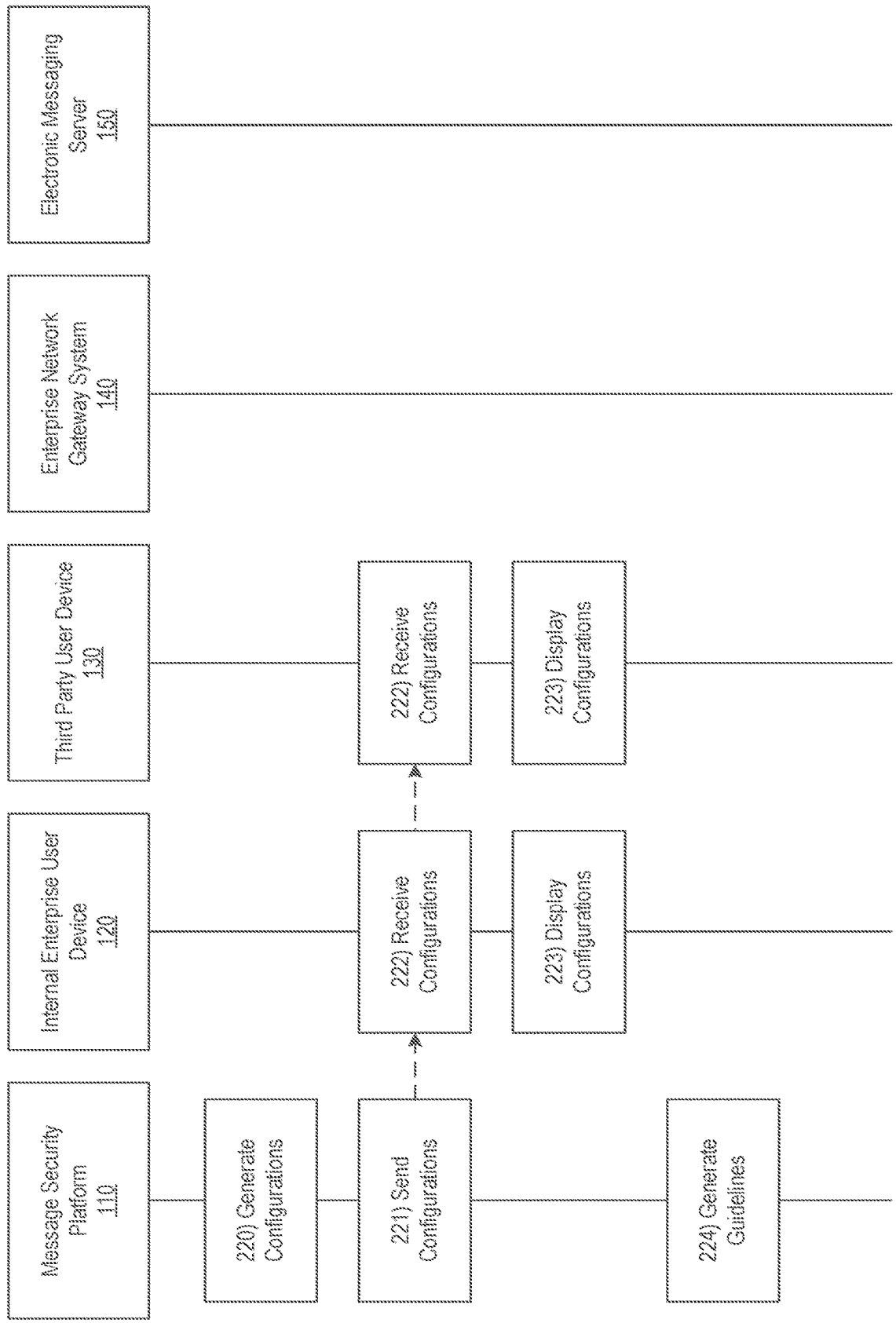

Referring to FIG. 2E, at step 220, based on the determination at step 214 that a weighted score did not exceed the first enhanced protection threshold, the message security platform 110 may generate configuration information based on the corresponding external domain. For example, the message security platform 110 may generate information indicating suggested configuration settings for an email gateway to mitigate or avoid future issues (e.g., based on current settings and/or messages received and/or analyzed by the message security platform 110).

At step 221, the message security platform 110 may send, share, or otherwise provide configuration information to the internal enterprise user device 120 and/or the third party user device 130. For example, the message security platform 110 may send configuration information to the internal enterprise user device 120 and/or the third party user device 130 while the second and/or third data connections are established.

At step 222, the internal enterprise user device 120 and/or the third party user device 130 may receive or otherwise access the configuration information sent at step 221. For example, the internal enterprise user device 120 and/or the third party user device 130 may receive the configuration information while the second and/or third data connections are established.

At step 223, the internal enterprise user device 120 and/or the third party user device 130 may display a configuration interface based on the configuration information received at step 222. For example, the internal enterprise user device 120 and/or the third party user device 130 may display a graphical user interface similar to graphical user interface 400, which is shown in FIG. 4. For instance, in displaying such a user interface, the internal enterprise user device 120 and/or the third party user device 130 may display a recommended configuration change based on a detected threat corresponding to the external domain. In some instances, the generation and display of the configuration interface described above at steps 220-223 may be performed in addition to or instead of the generation and/or display of the reports, alerts, and/or other messages described above at steps 215-219.

At step 224, based on the determination at step 214 that a weighted score did not exceed the first enhanced protection threshold, the message security platform 110 may generate guideline information based on the corresponding external domain. For example, in generating such guideline information, the message security platform 110 may generate general and/or specific mitigation guidelines (which may, e.g., include information suggesting how to adjust system configuration settings based on the configuration information generated at step 220). In some instances, in generating the guideline information, the message security platform 110 may generate information directing administrators to configure systems that might not be directly addressable by the message security platform 110, and may instead be addressable using a tool from a third party vendor.

Figure 2F:
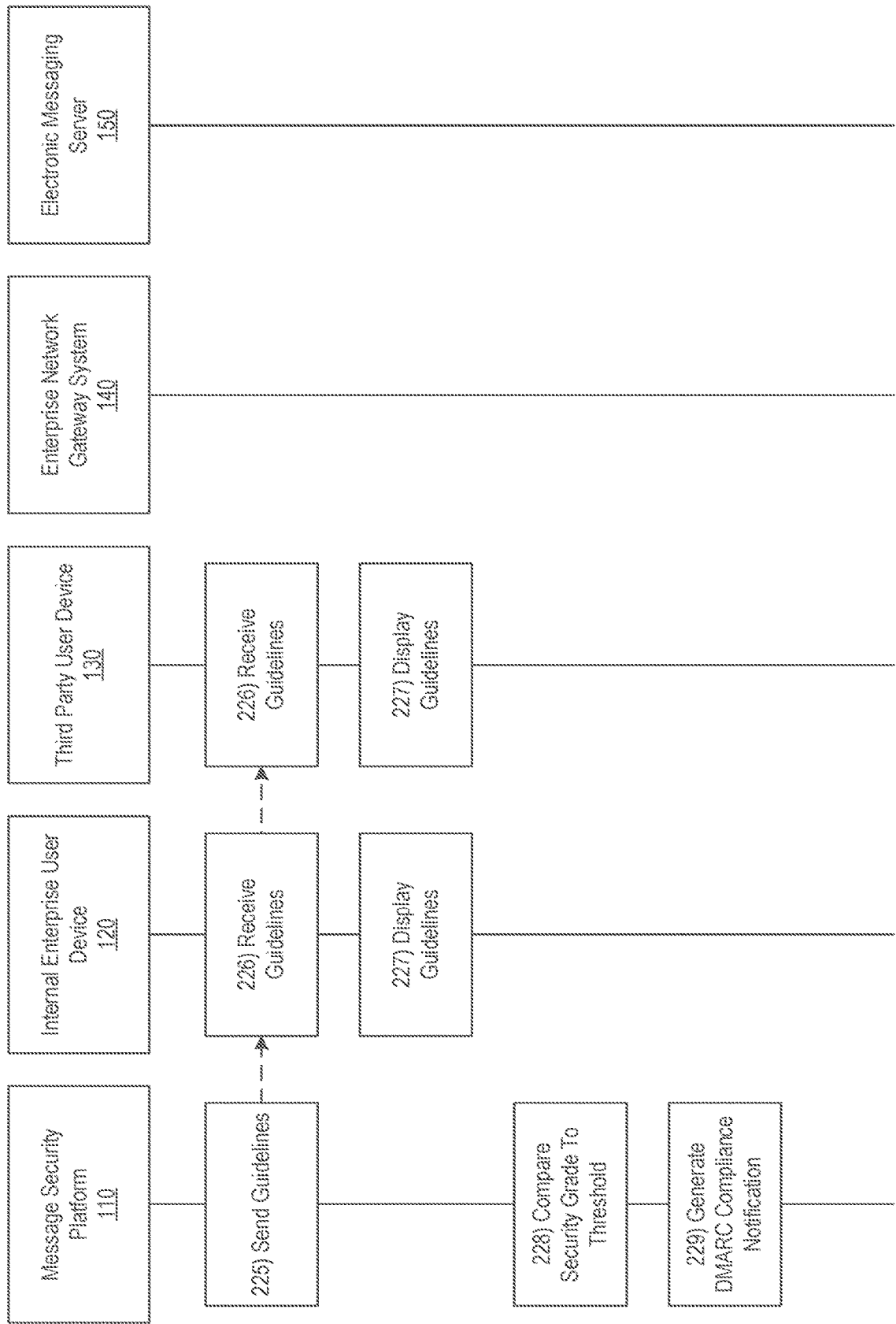

Referring to FIG. 2F, at step 225, the message security platform 110 may send, share, or otherwise provide the guideline information to the internal enterprise user device 120 and/or the third party user device 130. For example, the message security platform 110 may send the guideline information to the internal enterprise user device 120 and/or the third party user device 130 via the communication interface and while the second and/or third data connections are established.

At step 226, the internal enterprise user device 120 and/or the third party user device 130 may receive or otherwise access the guideline information sent at step 225. For example, the internal enterprise user device 120 and/or third party user device 130 may receive the guideline information while the second and/or third data connections are established.

Figure 5:
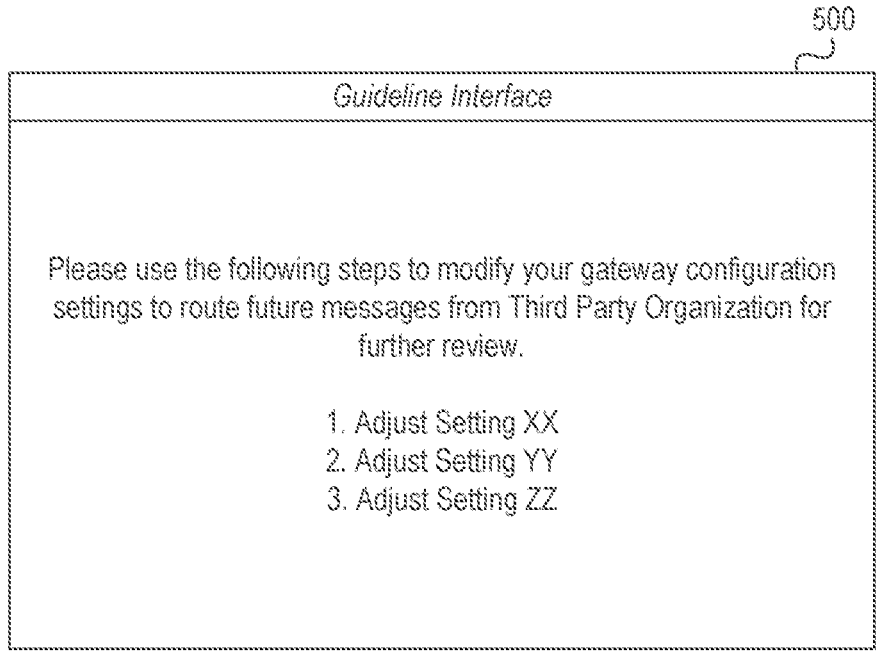

At step 227, the internal enterprise user device 120 and/or the third party user device 130 may display a guideline interface based on the guideline information received at step 226. For example, the internal enterprise user device 120 and/or the third party user device 130 may display a guideline interface similar to graphical user interface 500, which is shown in FIG. 5. For instance, in displaying such a user interface, the internal enterprise user device 120 and/or the third party user device 130 may display guidelines for changing configuration settings. Additionally or alternatively, in displaying such a user interface, the internal enterprise user device 120 and/or the third party user device 130 may display an indication of what a third party vendor corresponding to the external domain should fix and/or otherwise adjust on their own systems. Additionally or alternatively, in displaying such a user interface, the internal enterprise user device 120 and/or the third party user device 130 may display an indication of proposed contract modifications with the third party vendor corresponding to the external domain. In some instances, the guideline interface generation and display described at steps 224-227 may be performed in addition or as an alternative to generation and/or display of the reports, alerts, and/or other messages in steps 215-219 and/or the generation and/or display of the configurations in steps 220-223.

At step 228, in addition or as an alternative to the informative protection actions described in steps 215-227, if the message security platform 110 previously determined that a weighted grade exceeded the first enhanced protection threshold at step 214, the message security platform 110 may compare that weighted grade to a second enhanced protection threshold to identify whether active protection actions or automated protection actions should be performed.

If the message security platform 110 determines that a weighted grade does not exceed the second enhanced protection threshold enhanced protection threshold, the message security platform 110 may proceed to step 229 with regard to the corresponding external domain to perform one or more active protection actions. If the message security platform 110 determines that a weighted grade does exceed the second enhanced protection threshold, the message security platform 110 may proceed to step 242 with regard to the corresponding external domain to perform one or more automated protection actions. In some instances, the message security platform 110 may dynamically adjust the second enhanced protection threshold using one or more machine learning algorithms and/or based on a user input to maintain a predetermined rate of weighted grades that exceed the second enhanced protection threshold.

At step 229, based on the determination that a weighted grade does not exceed the second enhanced protection threshold, the message security platform 110 may generate one or more commands, messages, and/or notifications that may direct or otherwise cause the enterprise organization to employ stronger authentication requirements and/or security policies for email from the external domain (e.g., such as SPF, DKIM, DMARC, TLS enforcement, or other automated and/or manually configured trust and/or reputation metrics). For example, the message security platform 110 may generate the one or more DMARC compliance commands, messages, and/or notifications based on the determination that the weighted grade did not exceed the second enhanced protection threshold at step 228.

Referring to FIG. 2G, at step 230, the message security platform 110 may send, share, or otherwise provide the one or more email authentication verification commands, messages, and/or notifications to the internal enterprise user device 120 and/or the third party user device 130 (e.g., to enforce compliance with SPF, DKIM, DMARC, TLS, or other automated and/or manually configured trust and/or reputation metrics). For example, the message security platform 110 may send the one or more DMARC commands, messages, and/or notifications to the internal enterprise user device 120 and/or the third party user device 130 via the communication interface 113 and while the second and/or third data connections are established.

At step 231, the internal enterprise user device 120 and/or third party user device 130 may receive or otherwise access the one or more email authentication verification commands, messages, and/or notifications (e.g., the one or more DMARC compliance commands, messages, and/or notifications) from the message security platform 110. For example, the internal enterprise user device 120 and/or third party user device 130 may receive the one or more DMARC commands, messages, and/or notifications while the second and/or third data connections are established.

Figure 6:
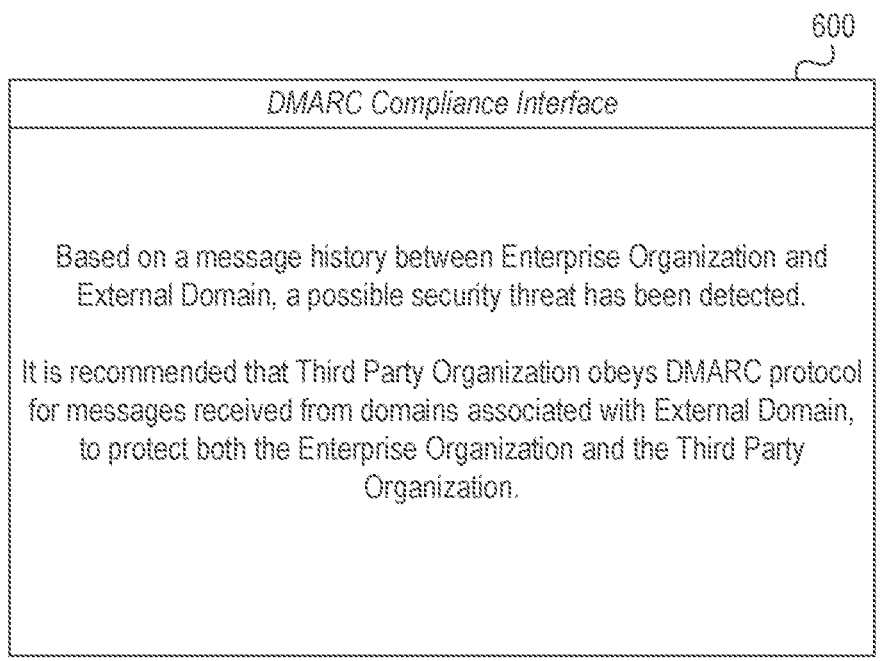

At step 232, the internal enterprise user device 120 and/or third party user device 130 may display the one or more email authentication verification commands, messages, and/or notifications (e.g., the one or more DMARC compliance commands, messages, and/or notifications) received at step 231. For example, the internal enterprise user device 120 and/or third party user device 130 may display a graphical user interface similar to graphical user interface 600, which is shown in FIG. 6. In displaying such a user interface, the internal enterprise user device 120 and/or third party user device 130 may, for instance, display an indication that the enterprise organization and/or the third party organization (e.g., the vendor in the supply chain of the enterprise organization) should enforce inbound email authentication verification (e.g., such as SPF, DKIM, DMARC, or other automated and/or manually configured trust and/or reputation metrics) for messages from the external domain.

At step 233, based on the determination that the weighted grade does not exceed the second enhanced protection threshold, the message security platform 110 may generate one or more rule configuration commands. For example, the message security platform 110 may generate one or more commands, messages, and/or notifications directing a user (e.g., of an internal or external enterprise user device) to update a security configuration of the enterprise network gateway system 140. Additionally or alternatively, the message security platform 110 may generate one or more commands directing internal enterprise user device 120 itself to configure messages from specified external entities to include an informational banner warning the recipient to be vigilant when interacting with the message.

At step 234, the message security platform 110 may send, share, or otherwise provide the one or more rule configuration commands to the internal enterprise user device 120 and/or third party user device 130. For example, the message security platform 110 may send the one or more rule configuration commands to the internal enterprise user device 120 and/or third party user device 130 via the communication interface 113 and while the second and/or third data connections are established.

At step 235, the internal enterprise user device 120 and/or third party user device 130 may receive the one or more rule configuration commands from the message security platform 110. For example, the internal enterprise user device 120 and/or third party user device 130 may receive the one or more rule configuration commands from the message security platform 110 while the second and/or third data connections are established.

Figure 2H:
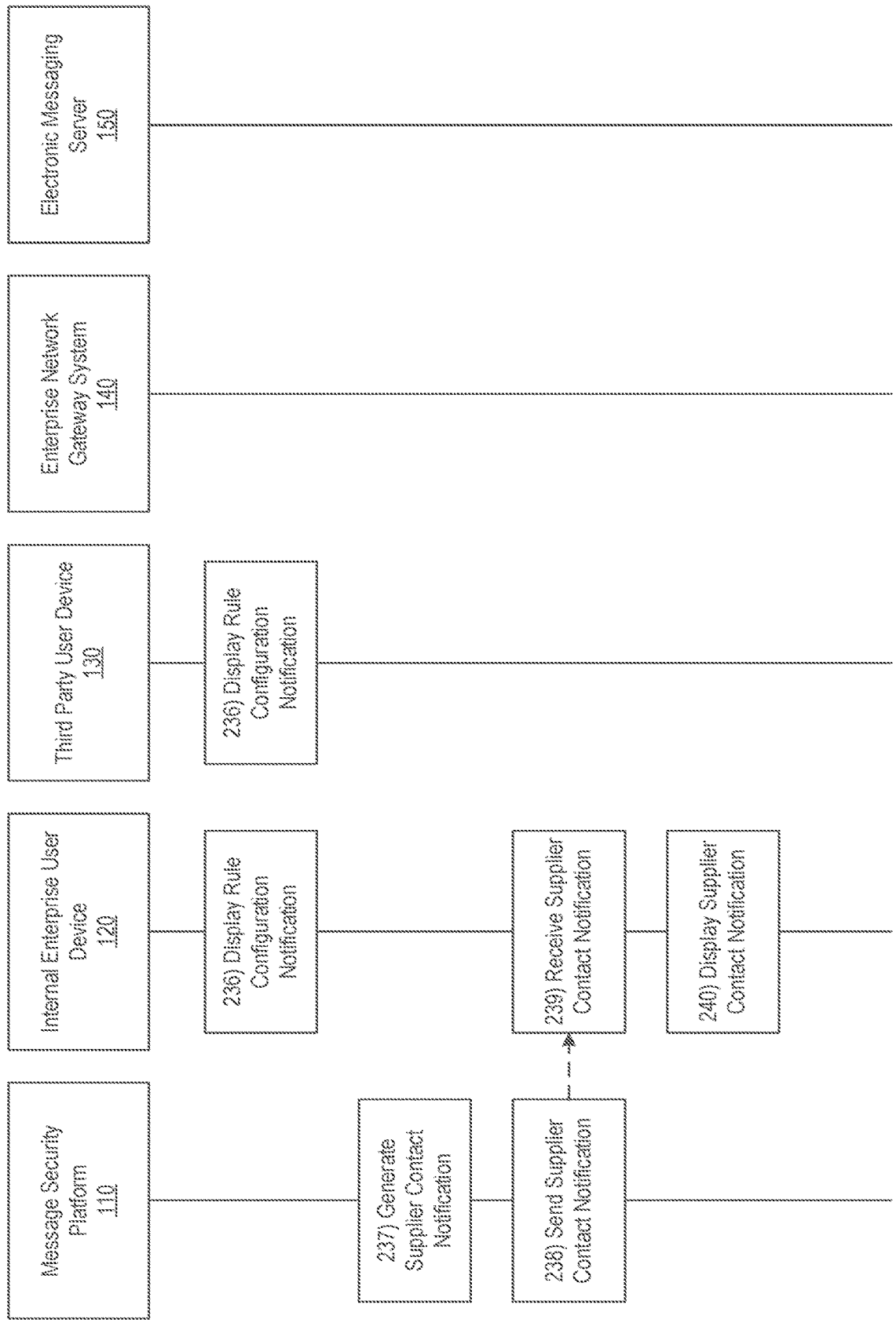

Referring to FIG. 2H, at step 236, the internal enterprise user device 120 and/or third party user device 130 may configure one or more rules based on the received one or more rule configuration commands received at step 235. For example, the internal enterprise user device 120 and/or third party user device 130 may configure messages from specified external entities (e.g., the external domain) to include an informational banner warning the recipient (e.g., an employee of the enterprise organization) to be vigilant when interacting with the message. Additionally or alternatively, the internal enterprise user device 120 and/or third party user device 130 may display a notification directing a user to update a security configuration of the enterprise network gateway system 140. Additionally or alternatively, the internal enterprise user device 120 and/or third party user device 130 may initiate and display a security awareness training program. In some instances, the rule configuration commands may be generated and sent to the internal enterprise user device 120 and/or third party user device 130 in addition or as an alternative to generation and display of the DMARC compliance notification described in steps 229-232

At step 237, based on the determination that a weighted grade did not exceed the second enhanced protection threshold, the message security platform 110 may generate a supplier contact notification. For example, the message security platform 110 may generate a notification indicating an external entity (e.g., a non-conforming vendor or supplier affiliated with the external domain) associated with one or more security issues, mitigation actions, or the like.

At step 238, the message security platform 110 may send, share, or otherwise provide the supplier contact notification to the internal enterprise user device 120. For example, the message security platform 110 may send the supplier contact notification to the internal enterprise user device 120 via the communication interface 113 and while the second data connection is established.

At step 239, the internal enterprise user device 120 may receive or otherwise access the supplier contact notification sent at step 238. For example, the internal enterprise user device 120 may receive the supplier contact notification while the second wireless data connection is established.

Figure 7:
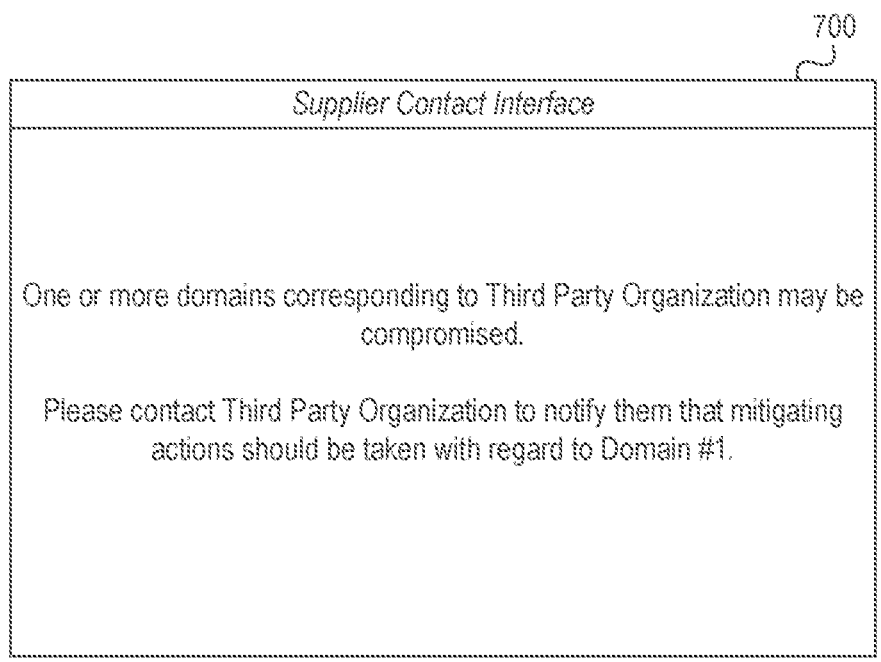

At step 240, the internal enterprise user device 120 may display the supplier contact notification. For example, the internal enterprise user device 120 may display a graphical user interface similar to graphical user interface 700, which is shown in FIG. 7. In displaying such a user interface, the internal enterprise user device 120 may display a graphical user interface indicating that a third party supplier should be contacted regarding one or more security issues, mitigation actions, or the like. In some instances, the generation and display of the supplier contact notification may occur in addition or as an alternative to generation and display of the DMARC compliance notification described in steps 229-232 and/or the rule configuration commands described in steps 233-236.

Figure 2I:
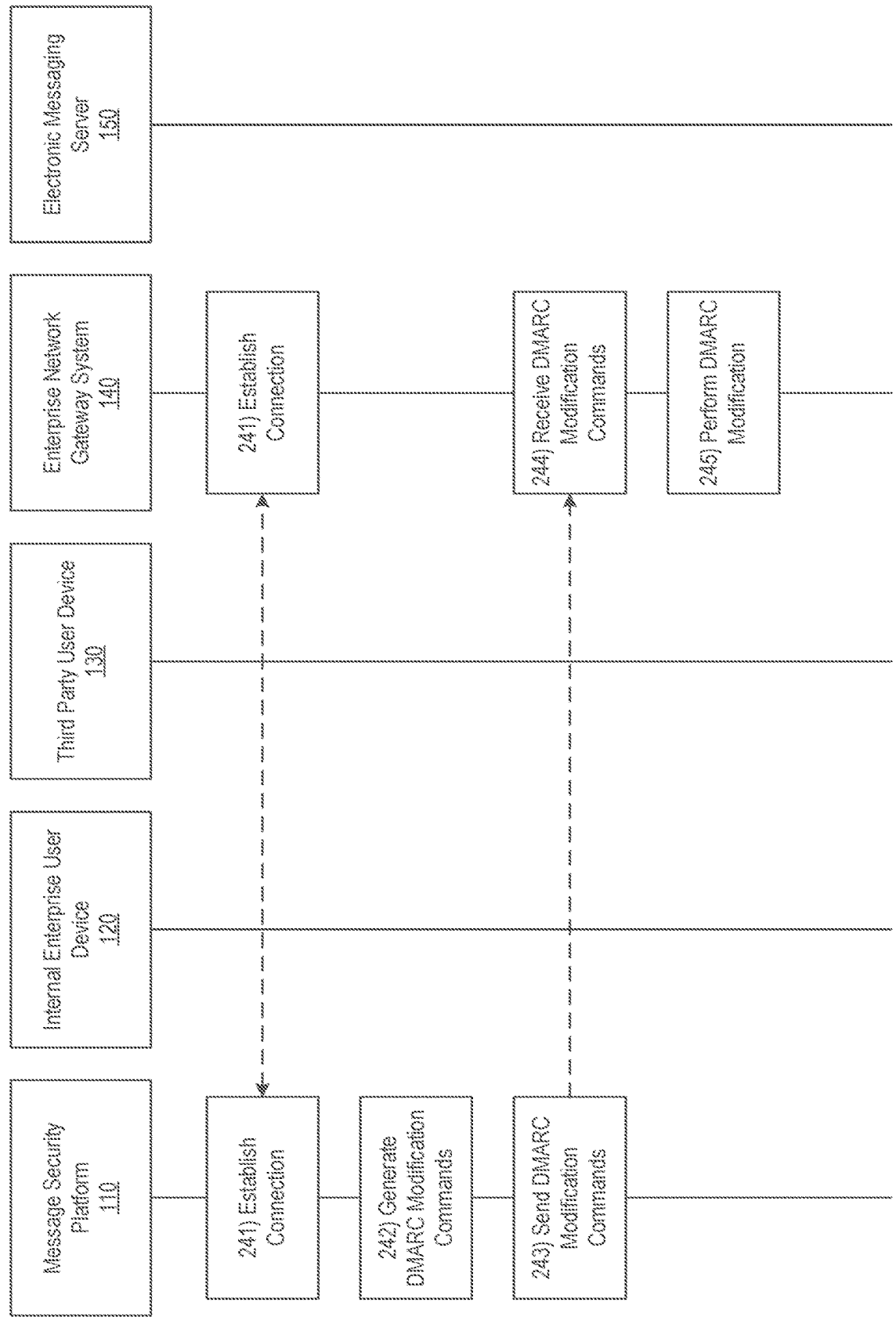

Referring to FIG. 2I, at step 241, the message security platform 110 may establish a connection with the enterprise network gateway system 140. For example, the message security platform 110 may establish a fourth data connection with the enterprise network gateway system 140 to link the message security platform 110 to the enterprise network gateway system 140 (e.g., in preparation for sending one or more DMARC modification commands). In some instances, the message security platform 110 may identify whether or not a connection is already established with the enterprise network gateway system 140. If a connection is already established with the enterprise network gateway system 140, the message security platform 110 might not re-establish the connection. If a connection is not yet established with the enterprise network gateway system 140, the message security platform 110 may establish the fourth data connection as described herein.

At step 242, in addition or as an alternative to the informative protection actions described in steps 215-227 and/or the active protection actions described in steps 228-241, if the message security platform 110 previously determined that a weighted grade exceeded the second enhanced protection threshold at step 228, the message security platform 110 may initiate one or more automated protection actions as described in steps 242-253. Additionally or alternatively, the message security platform 110 may execute the one or more automated protection actions based on information determined by and/or received from other similar computing platforms operating with similar characteristics, which may be identified manually and/or automatically via machine learning techniques. For example, the message security platform 110 may generate one or more DMARC modification commands directing the enterprise network gateway system 140 to enforce inbound email authentication verification (e.g., such as SPF, DKIM, DMARC, or other automated and/or manually configured trust and/or reputation metrics). For example, the message security platform 110 may determine that a third party organization has a respectable security grade (e.g., above a predetermined threshold), but that the third party organization does not have a deployed DMARC security policy. In these instances, the message security platform 110 may generate one or more commands that may cause a virtual DMARC policy to be applied to the third party organization.

At step 243, the message security platform 110 may send, share, or otherwise provide the one or more DMARC modification commands to the enterprise network gateway system 140. For example, the message security platform 110 may send the one or more DMARC modification commands to the enterprise network gateway system 140 via the communication interface and while the fourth data connection is established.

At step 244, the enterprise network gateway system 140 may receive or otherwise access the one or more DMARC modification commands sent at step 243. For example, the enterprise network gateway system 140 may receive the one or more DMARC modification commands while the fourth data connection is established.

At step 245, the enterprise network gateway system 140 may automatically modify one or more system or network policies to conform with DMARC protocol, execute one or more virtual DMARC actions, or the like. For example, the enterprise network gateway system 140 may perform one or more actions at step 245 based on or in response to the one or more DMARC modification commands received at step 244. For example, the enterprise network gateway system 140 may automatically apply a virtual DMARC policy to one or more specific domains (e.g., the external domain) to protect against spoofing.

Referring to FIG. 2J, at step 246, the message security platform 110 may initiate one or more BEC protection actions. For example, the message security platform 110 may apply natural language processing to detect BEC attempts (e.g., spoofed emails sent to enterprise users originating from an email address corresponding to their boss's name and a consumer mailbox provider). In some instances, the message security platform 110 may initiate the one or more BEC protection actions based on or in response to the determination that the weighted grade exceeds the second enhanced protection threshold. In some instances, the message security platform 110 may initiate the one or more BEC protection actions in addition or as an alternative to the DMARC modifications/actions described in steps 243-245.

At step 247, the message security platform 110 may generate one or more compliance monitoring commands. For example, the message security platform 110 may generate one or more commands directing enterprise network gateway system 140 to monitor one or more domains (e.g., the external domain) for compliance with one or more policies (such as vendor risk management (VRM) policies), guidelines, or the like and to generate alerts when non-compliance is detected. In some instances, the message security platform 110 may perform the compliance monitoring itself (e.g., rather than directing the enterprise network gateway system 140 to perform these actions).

At step 248, the message security platform 110 may send, share, or otherwise provide the one or more compliance monitoring commands to the third party user device 130. For example, the message security platform 110 may send the one or more compliance monitoring commands to the third party user device 130 via the communication interface 113 and while the third data connection is established.

At step 249, the third party user device 130 may receive or otherwise access the one or more compliance monitoring commands sent at step 248. For example, the third party user device 130 may receive the one or more compliance monitoring commands while the third data connection is established.

At step 250, the third party user device 130 (or another computing system affiliated with the third party organization) may perform compliance monitoring (e.g., based on or in response to the one or more compliance monitoring commands received at step 249). For example, the third party user device 130 may monitor one or more domains (e.g., the external domain) for compliance with one or more policies, guidelines, or the like and may generate alerts when non-compliance is detected. In some instances, the third party user device 130 may receive a list of potentially compromised email addresses corresponding to the third party organization, and the third party organization may begin monitoring this list. In these instances, if the message security platform 110 detects an improved weighted grade corresponding to one or more of these email addresses, the message security platform 110 may notify the third party user device 130, and monitoring may be adjusted accordingly. In some instances, the third party user device 130 may automatically enroll individuals associated with the identified email addresses into a training program to test awareness of malicious messages. Additionally or alternatively, the third party user device 130 may cause messages originating from these email addresses to include warning or security banners based on the weighted scores (which may, in some instances, be unique based on a context or industry of the third party organization). In some instances, the compliance monitoring described in steps 247-250 may be performed in addition or as an alternative to the DMARC actions described in steps 242-245 and/or the BEC protection actions described at step 246.

In some instances, the systems and event sequence described above may be modular, and may allow for the addition or removal of other modules and/or algorithms in addition to the relationship identification, security scoring, and enhanced protection processes described above. The steps described in the illustrative event sequence herein may be performed in any alternative sequence or order without departing from the scope of the disclosure.

Figure 8:
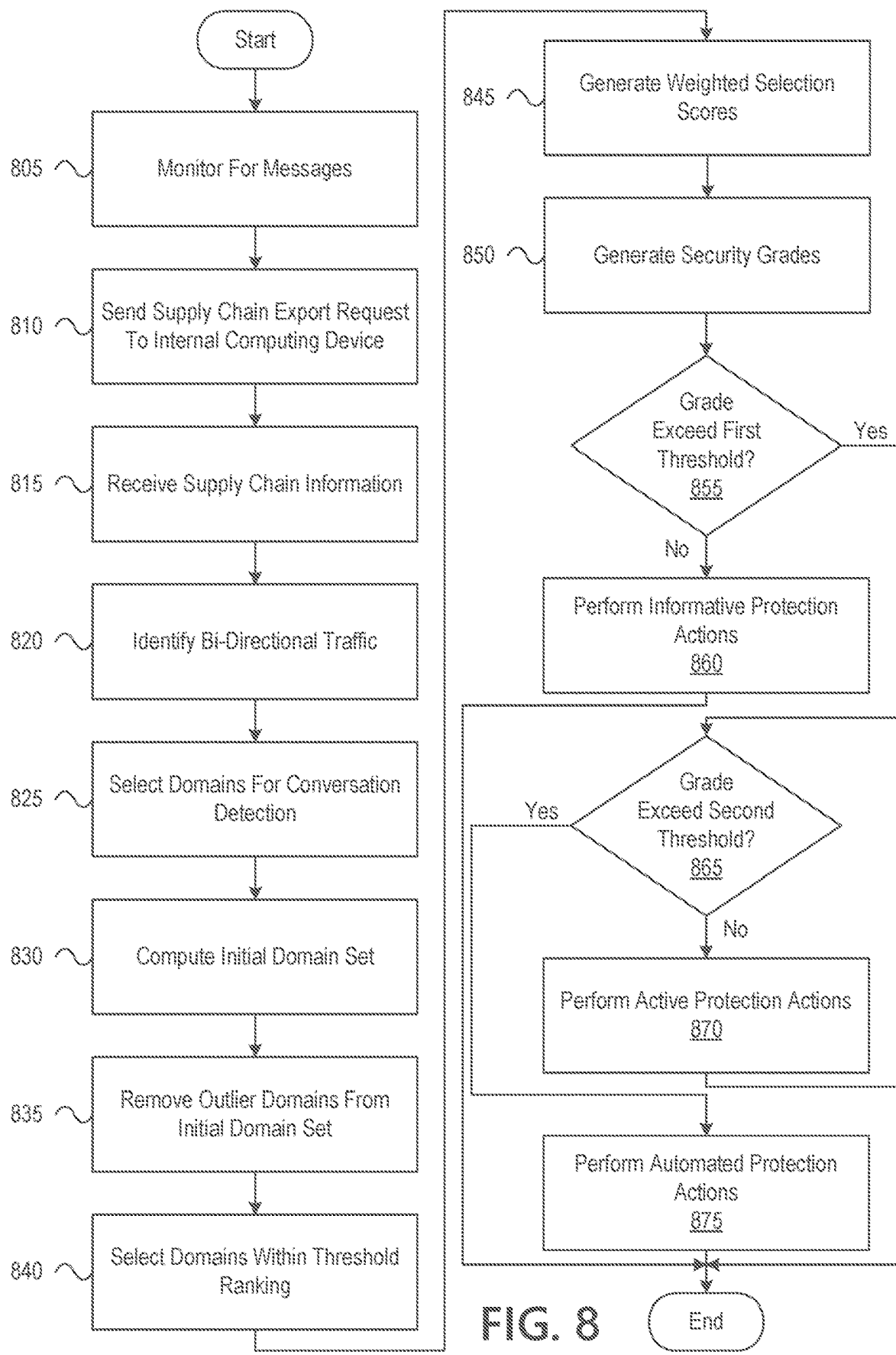
FIG. 8 depicts an illustrative method for performing dynamic message analysis and executing enhanced protection actions in accordance with one or more example embodiments.

FIG. 8 depicts an illustrative method for performing dynamic message analysis and executing enhanced protection actions in accordance with one or more example embodiments. Referring to FIG. 8, at step 805, a computing platform having at least one processor, a communication interface, and memory may monitor an electronic messaging server for messages. At step 810, the computing platform may send a request to an internal enterprise user device requesting supply chain information. At step 815, the computing platform may receive the supply chain information. At step 820, the computing platform may identify domains with bi-directional traffic included in the supply chain information. At step 825, the computing platform may select domains for a conversation detection process. At step 830, the computing platform may compute an initial domain set based on the selected domains. At step 835, the computing platform may remove outlier domains from the initial domain set. At step 840, the computing platform may select domains within a threshold ranking. At step 845, the computing platform may generate weighted selection scores for the domains within the threshold ranking. At step 850, the computing platform may generate security grades for the weighted selection scores. At step 855, the computing platform may identify whether or not the grades exceed a first enhanced protection threshold. For grades that do not exceed the first enhanced protection threshold, the computing platform may proceed to step 860. For grades that exceed the first enhanced protection threshold, the computing platform may proceed to step 865.

At step 860, the computing platform may perform one or more informative protection actions (e.g., generate reports, enhanced security configurations, guidelines, and/or perform other actions). At step 865, the computing platform may identify whether or not the grades exceed a second enhanced protection threshold. For grades that exceed the second enhanced protection threshold, the computing platform may proceed to step 875. For grades that do not exceed the second enhanced protection threshold, the computing platform may proceed to step 870.

At step 870, the computing platform may perform one or more active protection actions (e.g., DMARC compliance notifications, rule configuration commands, third party contact notifications, and/or other actions). At step 875, the computing platform may perform one or more automated protection actions (e.g., virtual DMARC actions, BEC protection actions, monitoring/alerting, and/or other actions).

The analysis processes, method steps, and/or methods described herein may be performed in different orders and/or in alternative arrangements from those illustrated herein, without departing from the scope of this disclosure. For example, in some instances, automated protection actions may be performed based on a determination that the first enhanced protection threshold is not exceeded, active protection actions may be performed based on a determination that the first enhanced protection threshold is exceeded but the second enhanced protection threshold is not exceeded, and informative protection actions may be performed based on a determination that the second enhanced protection threshold is exceeded. In doing so, automated protection actions may be performed for domains corresponding to the worst grades, active protection actions may be performed for domains corresponding to the middle grades, and informative protection actions may be performed for domains corresponding to the best grades (e.g., because automated protection actions may be used to address more severe threats than informative protection actions). Additionally or alternatively, combinations of different actions (e.g., combinations of informative protection actions, active protection actions, and automated protection actions) may be performed with respect to the same domain. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   identify, using one or more automated methods, one or more relationships between a plurality of message sender domains and a plurality of message recipient domains, wherein identifying one or more relationships between the plurality of message sender domains and the plurality of message recipient domains includes computing a final set of rank-ordered external domains based on a plurality of external domains selected for a conversation detection process, wherein computing the final set of rank-ordered external domains comprises:
   for each external domain of the plurality of external domains selected for the conversation detection process:
   1) identifying a first number of messages sent from one or more enterprise domains to the external domain;
   2) identifying a second number of messages received at the one or more enterprise domains from the external domain;
   3) computing a first ratio and a second ratio, wherein:
   the first ratio is the first number divided by the second number, and
   the second ratio is the second number divided by the first number;
   4) identifying a difference between the first ratio and the second ratio; and
   5) applying a weight value to the difference, resulting in a weighted difference value for the external domain;
   ranking the plurality of external domains selected for the conversation detection process based on each external domain's corresponding weighted difference in an initial set of rank-ordered domains; and
   removing, from the initial set of rank-ordered external domains, a set of one or more known outlier domains, resulting in a final set of rank-ordered external domains;
   after identifying the one or more relationships between the plurality of message sender domains and the plurality of message recipient domains, apply a security scoring process to an external domain of the final set of rank-ordered domains to compute a security score for the external domain of the final set of rank-ordered domains;
   determine a grade for the external domain of the final set of rank-ordered domains based on the security score for the external domain of the final set of rank-ordered domains; and
   based on the grade for the external domain of the final set of rank-ordered domains, execute one or more enhanced protection actions associated with the external domain of the final set of rank-ordered domains.

2. The computing platform of claim 1, wherein identifying the one or more relationships between the plurality of message sender domains and the plurality of message recipient domains further comprises using one or more manual methods to identify the one or more relationships between the plurality of message sender domains and the plurality of message recipient domains.

3. The computing platform of claim 2, wherein using the one or more manual methods to identify the one or more relationships between the plurality of message sender domains and the plurality of message recipient domains comprises:
   sending, to an internal enterprise user device, a request to export relationship data associated with the one or more relationships between the plurality of message sender domains and the plurality of message recipient domains; and
   receiving, from the internal enterprise user device, information identifying the one or more relationships between the plurality of message sender domains and the plurality of message recipient domains.

4. The computing platform of claim 3, wherein receiving the information identifying the one or more relationships between the plurality of message sender domains and the plurality of message recipient domains comprises receiving one or more enterprise resource planning (ERP) export files or one or more curated lists.

5. The computing platform of claim 1, wherein using the one or more automated methods to identify the one or more relationships between the plurality of message sender domains and the plurality of message recipient domains comprises:
    identifying, based on messages at an electronic messaging server, domains associated with bi-directional messaging traffic; and
    selecting, from the domains associated with the bi-directional messaging traffic, the plurality of external domains for the conversation detection process.

6. The computing platform of claim 1, wherein using the one or more automated methods to identify the one or more relationships between the plurality of message sender domains and the plurality of message recipient domains comprises identifying the one or more relationships between the plurality of message sender domains and the plurality of message recipient domains by one or more of: inspecting domain name system (DNS) records, applying one or more heuristics, applying machine learning algorithms, using methods for domain identification, applying natural language processing algorithms, or extrapolating based on common industry data.

7. The computing platform of claim 1, wherein applying the security scoring process to the external domain of the final set of rank-ordered domains comprises evaluating the external domain based on one or more of: a security posture corresponding to the external domain, historical threat information corresponding to the external domain, trust metrics, reputation data, or external data corresponding to security of the external domain.

8. The computing platform of claim 1, wherein applying the security scoring process to the external domain of the final set of rank-ordered domains results in: one or more domain scores corresponding to the external domain, one or more sender scores corresponding to a specific sender of one or more messages originating from the external domain, or one or more message scores corresponding to a specific message originating from the external domain.

9. The computing platform of claim 1, wherein executing the one or more enhanced protection actions associated with the external domain of the final set of rank-ordered domains comprises:
    comparing the grade for the external domain of the final set of rank-ordered domains to a first enhanced protection threshold;
    in response to determining that the grade for the external domain of the final set of rank-ordered domains does not exceed the first enhanced protection threshold, executing one or more informative protection actions; and
    in response to determining that the grade for the external domain of the final set of rank-ordered domains exceeds the first enhanced protection threshold:
        comparing the grade for the external domain of the final set of rank-ordered domains to a second enhanced protection threshold,
        in response to determining that the grade for the external domain of the final set of rank-ordered domains does not exceed the second enhanced protection threshold, executing one or more active protection actions, and
        in response to determining that the grade for the external domain of the final set of rank-ordered domains exceeds the second enhanced protection threshold, executing one or more automatic protection actions.

10. The computing platform of claim 9, wherein executing the one or more informative protection actions comprises:
    generating one or more alerts, reports, enhanced security configurations, or guidelines corresponding to electronic messaging security; and
    sending, to an internal enterprise user device, the one or more alerts, reports, enhanced security configurations, or guidelines.

11. The computing platform of claim 9, wherein executing the one or more active protection actions comprises one or more of:
    sending one or more commands to an enterprise user device directing the enterprise user device to enforce inbound email authentication verification for email from the external domain, wherein enforcing the inbound email authentication verification for email from the external domain comprises enforcing one or more of: SPF, DKIM, DMARC, or TLS,
    sending one or more commands to an internal enterprise user device or an external enterprise user device directing a user to update a security configuration of an enterprise network gateway,
    sending one or more commands to the internal enterprise user device directing the internal enterprise user device to configure messages from the external domain to include a warning message, or
    sending one or more commands to the internal enterprise user device or the external enterprise user device to initiate a security awareness training program.

12. The computing platform of claim 9, wherein executing the one or more automatic protection actions comprises one or more of:
    sending one or more commands to an enterprise network gateway directing the enterprise network gateway to enforce inbound email authentication verification for email from the external domain, wherein enforcing the inbound email authentication verification for email from the external domain comprises enforcing one or more of: SPF, DKIM, DMARC, or TLS, or
    monitoring the enterprise network gateway to enforce the inbound email authentication verification.

13. A method, comprising:
    at a computing platform comprising at least one processor, a communication interface, and memory:
    identifying, by the at least one processor and using one or more automated methods, one or more relationships between a plurality of message sender domains and a plurality of message recipient domains, wherein identifying one or more relationships between the plurality of message sender domains and the plurality of message recipient domains includes computing a final set of rank-ordered external domains based on a plurality of external domains selected for a conversation detection process, wherein computing the final set of rank-ordered external domains comprises:
        for each external domain of the plurality of external domains selected for the conversation detection process:
            1) identifying a first number of messages sent from one or more enterprise domains to the external domain;

2) identifying a second number of messages received at the one or more enterprise domains from the external domain;
3) computing a first ratio and a second ratio, wherein:
the first ratio is the first number divided by the second number, and
the second ratio is the second number divided by the first number;
4) identifying a difference between the first ratio and the second ratio; and
5) applying a weight value to the difference based on a volume of message exchanged, resulting in a weighted difference value for the external domain;
ranking the plurality of external domains selected for the conversation detection process based on each external domain's corresponding weighted difference in an initial set of rank-ordered domains; and
removing, from the initial set of rank-ordered external domains, a set of one or more known outlier domains, resulting in a final set of rank-ordered external domains;
after identifying the one or more relationships between the plurality of message sender domains and the plurality of message recipient domains, applying, by the at least one processor, a security scoring process to an external domain of the final set of rank-ordered domains to compute a security score for the external domain of the final set of rank-ordered domains;
determining, by the at least one processor, a grade for the external domain of the final set of rank-ordered domains based on the security score for the external domain of the final set of rank-ordered domains; and
based on the grade for the external domain of the final set of rank-ordered domains, executing, by the at least one processor, one or more enhanced protection actions associated with the external domain of the final set of rank-ordered domains.

14. The method of claim 13, wherein identifying the one or more relationships between the plurality of message sender domains and the plurality of message recipient domains further comprises using one or more manual methods to identify the one or more relationships between the plurality of message sender domains and the plurality of message recipient domains.

15. The method of claim 14, wherein using the one or more manual methods to identify the one or more relationships between the plurality of message sender domains and the plurality of message recipient domains comprises:
sending, by the at least one processor and to an internal enterprise user device, a request to export relationship data associated with the one or more relationships between the plurality of message sender domains and the plurality of message recipient domains; and
receiving, at the at least one processor and from the internal enterprise user device, information identifying the one or more relationships between the plurality of message sender domains and the plurality of message recipient domains.

16. The method of claim 15, wherein receiving the information identifying the one or more relationships between the plurality of message sender domains and the plurality of message recipient domains comprises receiving, by the at least one processor, one or more enterprise resource planning (ERP) export files or one or more curated lists.

17. The method of claim 13, wherein using the one or more automated methods to identify the one or more rela-tionships between the plurality of message sender domains and the plurality of message recipient domains comprises:
identifying, by the at least one processor and based on messages at an electronic messaging server, domains associated with bi-directional messaging traffic; and
selecting, by the at least one processor and from the domains associated with the bi-directional messaging traffic, the plurality of external domains for the conversation detection process.

18. One or more non-transitory computer-readable media storing instructions that, when executed by a computing platform comprising at least one processor, a communication interface, and memory, cause the computing platform to:
identify, using one or more automated methods, one or more relationships between a plurality of message sender domains and a plurality of message recipient domains, wherein identifying one or more relationships between the plurality of message sender domains and the plurality of message recipient domains includes computing a final set of rank-ordered external domains based on a plurality of external domains selected for a conversation detection process, wherein computing the final set of rank-ordered external domains comprises:
for each external domain of the plurality of external domains selected for the conversation detection process:
1) identifying a first number of messages sent from one or more enterprise domains to the external domain;
2) identifying a second number of messages received at the one or more enterprise domains from the external domain;
3) computing a first ratio and a second ratio, wherein:
the first ratio is the first number divided by the second number, and
the second ratio is the second number divided by the first number;
4) identifying a difference between the first ratio and the second ratio; and
5) applying a weight value to the difference based on a, resulting in a weighted difference value for the external domain; and
ranking the plurality of external domains selected for the conversation detection process based on each external domain's corresponding weighted difference in an initial set of rank-ordered domains;
removing, from the initial set of rank-ordered external domains, a set of one or more known outlier domains, resulting in a final set of rank-ordered external domains;
after identifying the one or more relationships between the plurality of message sender domains and the plurality of message recipient domains, apply a security scoring process to an external domain of the final set of rank-ordered domains to compute a security score for the external domain of the final set of rank-ordered domains;
determine a grade for the external domain of the final set of rank-ordered domains based on the security score for the external domain of the final set of rank-ordered domains; and
based on the grade for the external domain of the final set of rank-ordered domains, execute one or more enhanced protection actions associated with the external domain of the final set of rank-ordered domains.

19. The one or more non-transitory computer-readable media of claim 18, wherein identifying the one or more relationships between the plurality of message sender domains and the plurality of message recipient domains further comprises using one or more manual methods to identify the one or more relationships between the plurality of message sender domains and the plurality of message recipient domains.

20. The one or more non-transitory computer-readable media of claim 19, wherein using the one or more manual methods to identify the one or more relationships between the plurality of message sender domains and the plurality of message recipient domains comprises:
- sending, to an internal enterprise user device, a request to export relationship data associated with the one or more relationships between the plurality of message sender domains and the plurality of message recipient domains; and
- receiving, from the internal enterprise user device, information identifying the one or more relationships between the plurality of message sender domains and the plurality of message recipient domains.

* * * * *